(12) United States Patent
Motycka et al.

(10) Patent No.: US 11,464,178 B2
(45) Date of Patent: Oct. 11, 2022

(54) METHOD FOR DYNAMICALLY INCREASING PLANT ROOT DEPTH

(71) Applicant: Rachio, Inc., Denver, CO (US)

(72) Inventors: Emil Motycka, Denver, CO (US); Christopher M. Klein, Denver, CO (US)

(73) Assignee: RACHIO, INC., Denver, CO (US)

(*) Notice: Subject to any disclaimer, the term of this patent is extended or adjusted under 35 U.S.C. 154(b) by 385 days.

(21) Appl. No.: 16/528,070

(22) Filed: Jul. 31, 2019

(65) Prior Publication Data

US 2020/0037520 A1    Feb. 6, 2020

Related U.S. Application Data

(60) Provisional application No. 62/845,120, filed on May 8, 2019, provisional application No. 62/712,736, filed on Jul. 31, 2018.

(51) Int. Cl.
*A01G 25/16* (2006.01)
*G05B 13/02* (2006.01)

(52) U.S. Cl.
CPC ......... *A01G 25/165* (2013.01); *A01G 25/167* (2013.01); *G05B 13/0265* (2013.01); *A01G 25/16* (2013.01)

(58) Field of Classification Search
CPC .... A01G 25/165; A01G 25/167; A01G 25/16; G05B 13/0265
See application file for complete search history.

(56) References Cited

U.S. PATENT DOCUMENTS

| | | | |
|---|---|---|---|
| 4,226,368 A * | 10/1980 | Hunter | A01G 25/023 239/570 |
| 8,215,570 B2 | 7/2012 | Hitt | |
| 9,565,810 B2 | 2/2017 | Eng et al. | |
| 10,015,938 B1 | 7/2018 | Malsam et al. | |
| 10,124,358 B1 | 11/2018 | Graham et al. | |
| 10,139,797 B2 * | 11/2018 | Mewes | G05B 17/02 |
| 2006/0108439 A1 * | 5/2006 | Zur | A01G 25/167 239/69 |
| 2009/0281672 A1 | 11/2009 | Pourzia | |
| 2010/0030389 A1 * | 2/2010 | Palmer | A01G 25/16 700/16 |
| 2015/0319941 A1 | 11/2015 | Klein et al. | |
| 2018/0235162 A1 * | 8/2018 | Verma | A01G 25/167 |
| 2020/0296906 A1 * | 9/2020 | Sun | G06Q 50/02 |

FOREIGN PATENT DOCUMENTS

| | | |
|---|---|---|
| IN | 201721018321 A | 9/2017 |
| WO | 9708942 A1 | 3/1997 |

* cited by examiner

*Primary Examiner* — Chad G Erdman
(74) *Attorney, Agent, or Firm* — Dorsey & Whitney LLP

(57) ABSTRACT

According to one embodiment, a method for generating a dynamic watering plan that reduces water consumption requirements for vegetation is disclosed. An example method includes estimating root depth of vegetation watered by a watering system; determining an allowed water depletion threshold of the vegetation based on the root depth; determining a training watering plan to increase the root depth of the vegetation over time based on the root depth and the allowed water depletion threshold; and transmitting the training watering plan to a flow controller for execution by the watering system.

19 Claims, 11 Drawing Sheets

METHOD FOR DYNAMICALLY INCREASING PLANT ROOT DEPTH

CROSS REFERENCE TO RELATED APPLICATIONS

This application claims the benefit of U.S. Provisional Application No. 62/712,736, filed Jul. 31, 2018, and entitled "Method for Dynamically Increasing Plant Root Depth," and U.S. Provisional Application No. 62/845,120, filed May 8, 2019, and entitled "Method for Dynamically Increasing Plant Root Depth," the entireties of both of which are incorporated herein by reference for all purposes.

TECHNICAL FIELD

The technology described herein relates generally to landscape health improvement and irrigation management systems.

BACKGROUND

Conventional landscape sprinkler systems require irrigation schedules be set manually at the beginning of a watering season and are typically not adjusted based on vegetation, soil conditions, weather, or water supply and demand forecasts. Additionally, homeowners typically lack knowledge about landscaping and sprinkler systems to create optimal irrigation schedules that minimize water consumption. This often results in an overwatered lawn with wasted water as runoff. When grass is overwatered, it limits its root zone growth to the minimum depth required to be sustainable. Longer roots are more desirable, as they are more drought resistant and can survive with less water.

Recent advances in watering systems include smart watering systems. Smart watering systems control irrigation schedules of a sprinkler system. This may include automatically updating irrigation schedules based on meteorological data. An example of a smart watering system is disclosed in U.S. Patent Application Publication No. 2015/0319941, entitled "System and method for an improved sprinkler control system," filed May 6, 2014, which is incorporated herein by reference for any and all purposes. Conventional smart watering systems also do not typically address root characteristics of the watered vegetation and moreover do not act to improve the vegetation characteristics to reduce water consumption.

The information included in this Background section of the specification, including any references cited herein and any description or discussion thereof, is included for technical reference purposes only and is not to be regarded subject matter by which the scope of the invention as defined in the claims is to be bound.

SUMMARY

In one embodiment, a method for generating a watering plan for vegetation is disclosed. The method includes estimating by the processing element root depth of vegetation watered by a watering system; determining by the processing element a training watering plan to increase the root depth of the vegetation; and transmitting or storing the training watering plan for execution by the watering system.

In another embodiment, a method for generating a watering plan for a sprinkler system is disclosed. The method includes estimating current root depth value for vegetation watered by the sprinkler system; determining an optimal root depth value of the vegetation, wherein the optimal root depth corresponds to a minimum watering volume for the vegetation to survive; and generating a training watering plan based on the current root depth value and the optimal root depth value, wherein the training plan reduces the water volume distributed by the sprinkler system over time.

In a further embodiment, a watering system for vegetation is disclosed. The watering system includes a central controller configured to receive, process, and transmit information; a sensor for detecting at least one of weather variables, soil moisture levels, or vegetation characteristics, wherein an output signal is sent to the central controller when the sensor is activated; one or more databases containing information on watering history and vegetation specifications and communicatively coupled to the central controller; and one or more controllers in communication with the central controller, the controllers configured to receive data from the central controller, wherein the one or more controllers open one or more sprinkler valves based on a watering schedule, wherein the watering schedule is selected to increase a root depth for the vegetation.

In yet another embodiment, a method for generating a root development plan is disclosed. The method includes estimating root depth value; translating the estimated root depth value to an optimal root depth value; and determining a watering plan to dynamically adjust root depth values based upon the optimal root depth value.

In another embodiment, a method for generating a dynamic watering plan that reduces water consumption requirements for vegetation is disclosed. The method includes estimating, by a processing element, root depth of vegetation watered by a watering system; determining, by the processing element, an allowed water depletion threshold of the vegetation based on the root depth; determining, by the processing element, a training watering plan to increase the root depth of the vegetation over time based on the root depth and the allowed water depletion threshold; and transmitting the training watering plan to a flow controller for execution by the watering system.

In another embodiment, a watering system for vegetation is disclosed. The watering system includes a server, a sensor, one or more databases, and one or more controllers. The server is configured to receive, process, and transmit information. The sensor detects at least one of weather variables, soil moisture levels, or vegetation characteristics. The one or more databases contain information on watering history and vegetation specifications and are communicatively coupled to the server. The one or more controllers are in communication with the server and are connected to at least one water outlet of a plurality of water outlets. The server includes a non-transitory computer readable media and is configured to execute instructions stored on the non-transitory computer readable media. The instructions include estimating a root depth value based on at least one of the weather variables, soil moisture levels, vegetation characteristics, watering history, and vegetation specifications; determining a water depletion threshold based on the root depth value; estimating a water depletion rate based on at least one of the weather variables, soil moisture levels, vegetation characteristics, watering history, and vegetation specifications; and determining a watering plan to increase the root depth value based at least on the root depth value, the water depletion threshold, and the water depletion rate.

In another embodiment, a method for improving landscape health of an area is disclosed. The method includes receiving, by a processor, landscape health data specific to the area, wherein the landscape health data comprises vegetation and soil data, the vegetation data comprising an estimated current root depth of the vegetation growing in the area; generating, by the processor, a recipe for a soil enhancement kit based on the landscape health data, wherein the recipe includes at least one soil additive for increasing the estimated current root depth of the vegetation; determining, by the processor, instructions for applying the soil enhancement kit to the area, wherein the instructions include information on timing, frequency, and duration of kit application; and transmitting, by the processor, the at least one soil additive and instructions to a customer.

In yet another embodiment, a method of generating a consumable manufacturing and delivery schedule is disclosed. The method includes determining, by a processor, vegetation growth over time based on one or more landscape characteristics; estimating, by the processor, consumable characteristics based on the vegetation growth over time, wherein the consumable characteristics comprise a consumable type and amount and a timing of application; analyzing, by the processor, a supplier logistics model to determine consumable supply and timing from acquisition or generation of the consumable to delivery; generating, by the processor, a manufacturing and delivery schedule based on the estimated consumable characteristics and the supplier logistics model; and utilizing by the processor, the manufacturing and delivery schedule to coordinate delivery of the consumable to a user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

DETAILED DESCRIPTION

Figure 1:
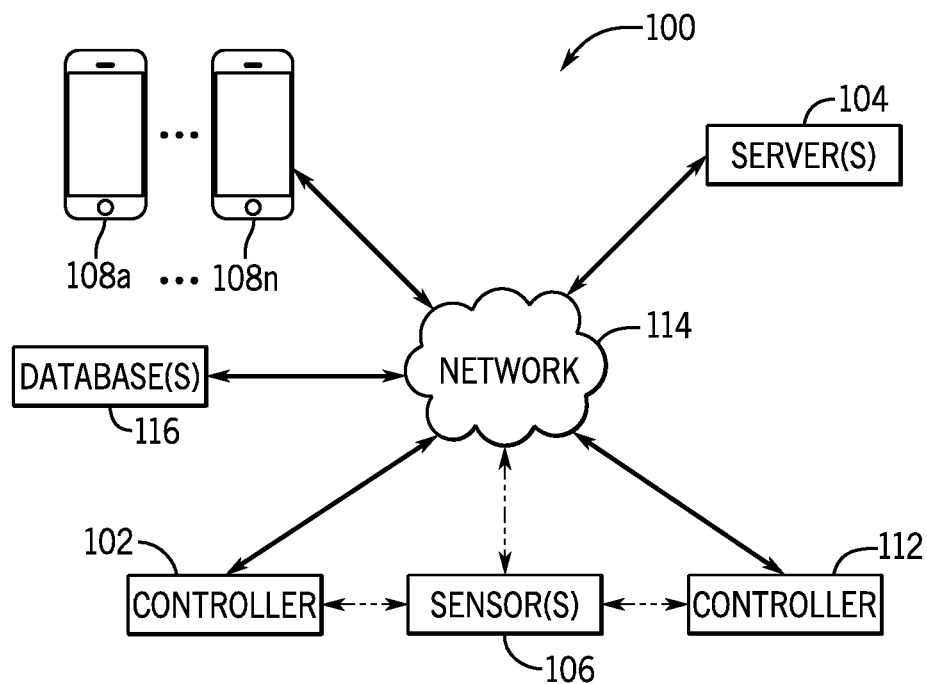
FIG. 1 is a block diagram illustrating an example of a watering system.

The present disclosure is generally related to systems and methods for improving vegetation health for irrigated vegetation such as grass. In some embodiments, vegetation health is improved by implementation of a dynamic watering schedule implemented by a watering controller (e.g., sprinkler controller) and/or the use of a soil enhancement kit. By improving vegetation health through the systems and methods of the present disclosure, the vegetation may utilize less water, be more sustainable, less susceptible to damage, and healthier.

Generally, vegetation, such as grass, perennials, and the like, are considered "healthy" when both the plant and the surrounding soil include characteristics that enable reduced water and/or increased growth for the vegetation. Numerous factors may impact vegetation health, e.g., direct vegetation characteristics (e.g., type, height, cover, density, root depth, chlorophyll content, etc.), indirect vegetation characteristics, such as soil conditions (e.g., type, density, porosity, moisture level and depth, water capacity, nutrient composition, microbe composition, etc.), environmental conditions (e.g., weather, sun exposure, landscape use, landscape age, etc.), historical watering patterns, and the like. To increase vegetation health, the present disclosure includes methods to encourage increased vegetation root depth utilizing a dynamic watering plan implemented by sprinklers or other watering systems and/or a soil enhancement kit that can test and introduce beneficial factors into the soil.

In some embodiments herein, a system to automatically and dynamically adjust vegetation root depth is disclosed. The system may include a central or cloud controller and one or more local controllers that activate sprinkler valves or other watering outlets based on schedules from the cloud controller. The system analyzes historical watering data, local environmental variables, vegetation and soil specifications, and water supply and demand forecasts to generate a root based watering plan that helps to increase the root depth of the vegetation over time. The watering plan may include an initial training phase and a subsequent green zone or sustainable watering phase. During the training phase, the system implements an initial watering schedule or training plan that exposes the vegetation to low or sustainable watering volumes, e.g., a minimum overall watering value, in order to encourage root growth. The watering volumes applied by the system may generally decrease over time as the vegetation becomes hardier and extends its roots, until a sustainable or other selected watering volume is reached, with the sustainable watering volume being generally a minimal amount of water that the vegetation can survive at a desired "lushness" state.

In one embodiment, the system receives actual root depth measurements or uses a root depth analysis to determine or estimate a current root depth of the vegetation to be "trained" (e.g., vegetation watered by a local controller). Utilizing the actual or estimated root depth, the system determines a watering plan to be implemented by the local controller that helps to gradually increase the root depth over time, adapting the vegetation so it can survive on a reduced or minimal watering volume, reducing the water consumption of the irrigated vegetation over time. During the training phase, the watering frequency may generally decrease until the maximum, optimal, or other desired root depth is met. After this training phase, during the green zone or sustainable watering phase, the system can implement a green zone or sustainable watering plan that reduces the overall water applied. It is noted that the sustainable watering plan may utilize a greater volume of water (e.g., a watering volume sufficient to engulf at least the lower portion of the roots) per watering event, but with less frequent watering events, or other predetermined watering plan based on desired vegetation characteristics. The green zone or sustainable watering plan may also account for weather, soil conditions, water supply and demand forecasts, user preferences, and the like to maintain the vegetation root depth. Conventional sprinkler controllers typically do not factor in root depth, nor cultivate vegetation to reach an optimal root depth, resulting in wasted water since the vegetation could survive on less water than is being distributed.

In some embodiments, the system estimates an initial root depth value by receiving and analyzing input data relating to historical watering schedules, vegetation characteristics, and soil conditions. Data relating to historical watering schedules may include watering time, watering frequency, average delivered water volume, average amount of water used per square foot of vegetation, or the like. Vegetation characteristics may include vegetation type (e.g., species), height, cover, and density, among other data. In some instances, a direct root measurement tool can also be used to determine vegetation root depth at a selected location or sample area, and that along with other characteristics and conditions can be used to extrapolate root depth for the entire vegetation coverage area. Soil conditions may include soil type, composition, density, porosity, and moisture level and depth, water capacity, among other data. This input data may be input by a user, by a third party database, and/or by sensors associated with the system 100. Using this data, the system estimates a root depth (e.g., how far the roots extend into the soil) for the vegetation zone.

Utilizing the actual or estimated root depth value, the system determines a root development plan to gradually encourage growth of the roots to an optimal, desired, or other predetermined root depth value. The optimal root depth may be based on a depth that would allow the vegetation to survive on a minimal total amount of water, but may also take into account a desired appearance by the user. For example, the minimum amount of water to ensure survival may result in "browner" or less vibrant vegetation and so the optimal root depth and watering schedule may also take into account appearance such that the minimum water for the vegetation might be higher than a minimum required for only the survival of the vegetation.

The root development watering plan may include a training plan that decreases the overall water volume delivered to the vegetation over time, causing roots to grow longer and extend deeper into the soil. In other words, the total water volume delivered over a week of watering events is reduced, but some watering events may actually deliver more water at a given time than previous watering events. Often, the training plan is selected to decrease the watering frequency gradually so as to not "shock" or harm the vegetation, while still increasing the drought hardiness over time. The training phase ends when the root depth is at the "green zone", e.g., when the vegetation can survive with minimum or otherwise predetermined watering amount.

In several embodiments, the dynamic watering plan may incorporate both a root depth threshold and an allowed water depletion threshold. For example, as the watering plan is implemented, the root depth dynamically adjusts (e.g., root depth increases). The water volume allotted per watering event may correspond to the root depth (e.g., a larger volume of water may be delivered during a watering event to saturate a larger volume of soil surrounding deeper roots) or otherwise change to allow longer and deeper water seepage into the soil surrounding the roots. Therefore, in several embodiments, estimated and on-going changes in root depth are factored into the dynamic watering plan. As another example, water depletion of the soil can stress the roots, encouraging the roots to grow more during each watering event. The amount of allowed water depletion may be varied based on root length or depth. For example, longer roots may survive larger water depletion times and amounts than shorter roots. By increasing the allowed water depletion (and therefore stressing the roots), longer roots typically result. In some embodiments, the allowed water depletion value is gradually increased to correspond with increasing root depth.

In several embodiments, the watering plan takes into account several factors related to vegetation health and soil conditions. For example, the factors may include one or more of root depth, chlorophyll content, crop coefficient, yield curve, soil water capacity, soil water content, soil water depletion rate, soil water depletion threshold, soil temperature, and the like. A watering schedule may be determined to increase root depth based on one or more of these factors. For example, based on root depth, the allowed water depletion value may be increased by adjusting the watering plan to increase non-watering time (e.g., training time) between watering events, resulting in less frequent watering events, greater water depletion (e.g., longer stresses to the roots), and increased root depth. For example, water in the soil may be allowed to deplete by 50% or more, 60% or more, 70% or more, 80% or more, 85% or more, 90% or more, 95% or more, or the like, before the occurrence of a watering event. In some embodiments, the watering plan executed by the system allows the roots to dry by at least 51% prior to initiating a watering event.

The system may incorporate feedback data to dynamically vary the green zone or ultimate watering plan and/or training plan. Feedback data may include user preferences, pre-programmed specifications, root depth measurement data, computer learning, or other sources. In one embodiment, feedback data can be provided by a user through a user device. For example, if after the green zone is reached (or at any point during the training plan), the user is dissatisfied with the color and/or health of the vegetation (e.g., the user wants a lusher lawn), the user can provide feedback to modify the watering plan. In this example, the green zone or sustainable watering plan may be adjusted to increase the watering threshold as compared to the watering threshold implemented based on the survival of the vegetation, without user input. This allows the vegetation to be a bit "greener" as more water is applied, but still be selected to increase root depth. In yet another example, the system can use pre-programmed user preferences to set or vary a watering plan. For example, a user can select a desired vegetation coloration, and, using a camera, the system can determine whether the vegetation color matches the selected preferences or whether more/less watering is needed and adjust accordingly.

In some embodiments, the watering plan may incorporate health factors, such as products (e.g., soil additives), organisms, or the like, applied to the soil and/or vegetation. For example, fertilizers (e.g., synthetic or organic), pesticides, compost, and the like may be applied to the soil and/or vegetation. The health factor may also include changes introduced indirectly by products applied to the soil, e.g., byproducts. For example, bacteria and/or fungi introduced as an applied product may mobilize different nutrients (e.g., phosphorus, nitrogen, potassium, etc.) within the soil. A user may input an applied product into the system, either directly or indirectly. For example, a user may scan a barcode on the product, upload an image of the product, manually enter ingredients, and the like. Such soil additives and/or their associated byproduct(s) may alter root depth, soil water content, soil water capacity, water depletion rate, and the like, and therefore the allowed water depletion threshold may increase in a corresponding manner.

One or more soil additives may have an activation period, such as a period of time for the additive to induct a measurable or impactful effect on the surrounding environment (e.g., the plant and/or soil). The activation period may start when the soil additive is applied to the soil or when a watering event occurs. For example, some soil additives become soluble and mobilized with water, enabling the additives to surround or come in contact with the roots. In this manner, the water may act as a catalyst for the soil additives. The activation period may be an inoculation period (e.g., a period of time for the additive to associate with and/or be absorbed by the roots) or dissolution period, or the like. The activation period may indicate the time needed for the vegetation characteristics (e.g., root depth, etc.) and/or soil conditions (e.g., water content, water capacity, water depletion rate, etc.) to change after application of the applied product. Accordingly, in some embodiments, the watering plan may be gradually adjusted based on the expected vegetation and soil changes resulting from the applied product (and/or byproduct) and the activation period. In other words, the activation period may be one of a plurality of inputs factored into the watering plan.

In some embodiments, a soil enhancement kit may be provided as or in addition to the applied product with a system of the present disclosure. The soil enhancement kit may be used to supplement or as an alternative to the root based watering plan to improve vegetation health. For example, the soil enhancement kit may be used to generate more desirable soil conditions for optimal root growth. The soil enhancement kit may include soil additives or agents that improve the condition of the soil, allowing for better growth and maintenance of vegetation growing therein. For example, the soil enhancement kit may include one or more of the following, in any combination: nutrients (e.g., nitrogen, phosphorus, potassium, etc.), fertilizer, soil conditioner, weed control, wetting agent, bio stimulant, bacteria, fungi, plant hormones, and the like.

The amount and type of additives included in the kit may be varied based on data related to the land, landscape, or watering area. For example, the landscape data may include information on current vegetation health (including, for example, current vegetation and soil conditions) and target vegetation health, local weather, seasonal changes, climate, historical watering patterns, current watering plan, and the like. The soil enhancement kit components may be dynamically generated by the system based on the specific inputs and needs of the respective landscape or other watering area, such that the components are tailored to the user's specific landscape or other area, e.g., a user's backyard. Additionally, as the user applies the various components to the soil, the component application may be taken as an input to the watering scheduler, to further update the watering program based on the expected changes to the soil due to the soil enhancement kit components. In other words, the soil enhancement kit variable can be an input to the controller to dynamically adjust the watering schedule to accommodate the increasing or otherwise varying soil health of the soil surrounding the roots, since vegetation planted in healthier or enhanced soil may be able to receive less water than vegetation (even with the same root depth) planted in less healthy soil.

Turning now to the figures, a system of the present disclosure will be discussed in more detail. FIG. 1 is a block diagram illustrating an example of a watering or irrigation system 100. The system 100 includes one or more irrigation system controllers 102, 112 that control one or more fluid delivery devices, e.g., sprinkler valves, irrigation drip lines, and the like. The irrigation controllers 102, 112 are in communication with one or more central controllers 104, which in turn may be in communication with one or more user devices 108a-108n, via a network 114. At least one of the irrigation controllers 102, 112 and/or the central controller 104 may be in communication with one or more sensors 106 that detect one or more weather variables (e.g., precipitation, humidity, atmospheric pressure, or the like), soil conditions (e.g., moisture levels), vegetation characteristics (e.g., height, root depth, cover, etc.), or the like, as discussed in more detail below. The one or more sensors 106 may include, for example, thermal sensors (e.g., a thermometer), pressure sensors (e.g., a barometer), motion sensors, visual sensors (e.g., a camera), or the like. At least one of the irrigation controllers 102, 112 and/or the central controller 104 and/or the user devices 108a-n, is in communication with one or more database(s) 116 that provide additional data to the system 100, such as, for example, weather data, soil data, and the like. Each of the various components of the watering system 100 may be in communication directly or indirectly with one another, such as through the network 114. In this manner, each of the components can transmit and receive data from other components in the system. In many instances, the central controller 104 may act as a go between for some of the components in the system 100.

The network 114 may be substantially any type or combination of types of communication systems for transmitting data either through a wired or wireless mechanism (e.g., WiFi, Ethernet, Bluetooth, cellular data, or the like). In some embodiments, certain components in the watering system 100 may communicate via a first mode (e.g., Bluetooth) and others may communicate via a second mode (e.g., WiFi). Additionally, certain components may have multiple transmission mechanisms and be configured to communicate data in two or more manners. The configuration of the network 114 and communication mechanisms for each of the components may be varied as desired and based on the needs of a particular configuration or property.

The irrigation system controllers 102, 112 control water flow to one or more water outlets, such as sprinkler valves, irrigation lines, sprinkler heads, or the like. In one embodiment, the irrigation system controllers 102, 112 are smart sprinkler controllers having processing elements, memory components, and control the operation of a plurality of sprinkler valves in one or more watering zones for a particular property or area (e.g., residential property). An example of a sprinkler controller that may be used with the system 100 can be found in U.S. Publication No. 2015/0319941 filed on May 6, 2014 and entitled "Sprinkler and Method for an Improved Sprinkler Control System," which is incorporated by reference herein in its entirety. The sprinkler valves may be electronically operated, such as one or more solenoid valves that open and close a flow path to a sprinkler head. The irrigation system controllers 102, 112 may include one or more components, such as those shown in FIG. 12.

The central controller 104 or server is one or more computing devices that process and execute information. The central controller 104 may include its own processing elements, memory components, and the like, and/or may be in communication with one or more external components (e.g., separate memory storage) (an example of computing elements that may be included in the central controller 104 is disclosed below with respect to FIG. 12). The central controller 104 may also include one or more server computers interconnected together via the network 114 or separate communication protocol, such as through a cloud based computing platform. The central controller 104 may host and execute a number of the processes performed by the system 100 and/or the irrigation system controllers 102, 112.

The user devices 108a, 108n are various types of computing devices, e.g., smart phones, tablet computers, desktop computers, laptop computers, set top boxes, gaming devices, wearable devices, or the like. The user devices 108a, 108n provide output to and receive input from a user. For example, the central controller 104 may transmit one or more alerts to the user devices 108a, 108n to indicate information regarding the irrigation system controllers 102, 112, fluid outlets, and/or the property being watered. The type and number of user devices 108a, 108n may vary as desired.

The sensor 106 is substantially any type of device that can detect one or more weather variables (e.g., precipitation, humidity, atmospheric pressure, temperature or the like), vegetation characteristics (e.g., coloration, height, cover, density, root depth, or the like), and/or soil characteristics (e.g., pH level, porosity, moisture level and depth, or the like) and transmit an electrical signal. The sensor 106 can include, for example, a thermometer, a barometer, a hygrometer, a tensiometer, gypsum blocks, a camera, portable meters, or the like. In some embodiments, the sensor 106 is a root depth sensor. In one embodiment, the root depth sensor is a manually operated prong inserted into the soil that may be analyzed by the user directly or an image captured of the measuring tool that is used to indirectly analyze the output and determine a root depth value. The root depth value may be input into the system 100 by the user (e.g., via a user device 108a, 108n) or may be retrieved from the system. For example, the root depth sensor may be a probe with a measuring device (e.g., a root depth ruler) that a user inserts into the ground to extract a vegetation and soil sample, allowing the user to measure the length of the roots. Alternatively, the root depth sensor may capture certain root-related data and automatically input the root-related data into the system 100 for the system 100 (e.g., the cloud) to analyze and estimate a root depth value. For example, the root depth sensor may include a camera that captures an underground image that may be transmitted to the system 100 for image processing to assess the root depth. The sensor 106 may transmit the electrical signal to the network 114 and/or at least one of the controllers 102, 112 via hardwired or wireless methods (e.g., WiFi, radio signals, Bluetooth, etc.). The central controller 104 can receive data from the sensor 106 to help generate an efficient watering plan.

The sensor 106 is typically positioned in, near, or adjacent to, an irrigation area watered by the watering system 100 and irrigation controller 102. The location and positioning of the sensor 106 may be varied based on the size, location, vegetation variation, and/or weather of the irrigation area.

The database(s) 116 may be an internal database of the system 100 or a third party database in communication with the system 100 over the network 114. An internal database 116 may store data related to current or historical watering schedules, vegetation characteristics, soil characteristics, zone characteristics, soil enhancement kits, and the like. A third party database 116 may store data related to weather, vegetation characteristics (e.g., nutrient requirements based on vegetation type), soil characteristics, zone characteristics, and the like. For example, a third party database 116 may include information on the temperature of the soil in a particular geographical area.

Root Based Watering Plan

A watering plan is generated and implemented by the system utilizing varying watering schedules that may be based on root depth of the vegetation in the selected area. For example, the watering plan may be varied to provide incremental periods of stress to the roots to encourage them to grow, i.e., the system will reduce total watering volume and/or times to encourage root growth. Periods of stress encourage longer roots so that the plants can retain more water to withstand the periods of stress. Longer roots have a greater surface area and require greater amounts of water and/or a longer watering duration. Because the longer roots will have access to a larger volume of soil that stores more water for a given watering event, the frequency of watering events can be reduced.

Figure 2A:
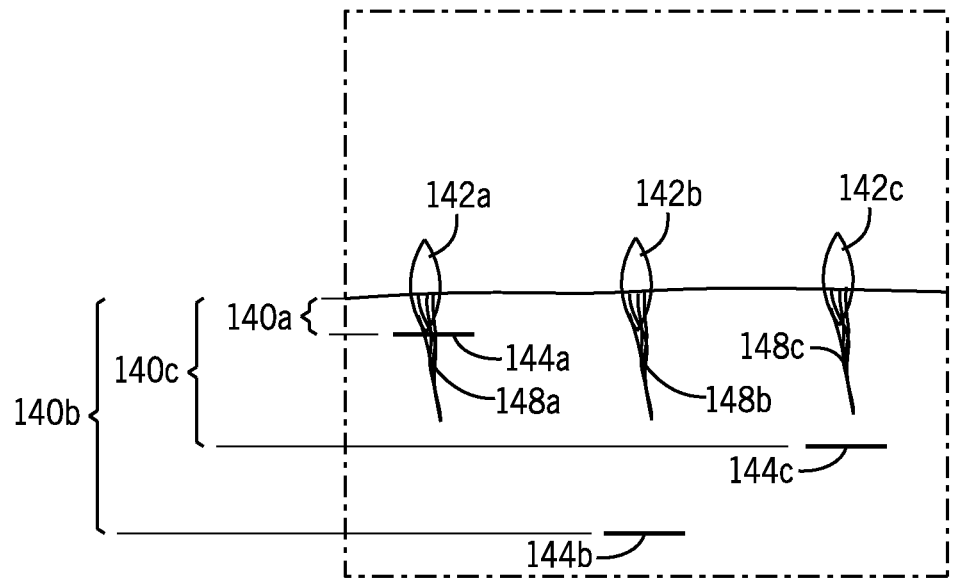
FIG. 2A is a diagram illustrating an example of varying watering depths for an exemplary plant.

As water is delivered via sprinklers, it percolates through the soil defining a saturation zone or depth (e.g., the area or depth in the soil where the pores and fractures are saturated with water). The watering plans generated by the system may generate watering times to deliver sufficient water volumes to define saturation zones that engulf at least a lower portion of the roots and extend just below the ends of the vegetation's roots. For example, the saturation zone may extend from just below the roots (e.g., from a lower boundary similar to lower boundary 144c of FIG. 2A, discussed in more detail below) along a lower portion of the roots that is less than half the length of the roots. As one example, the lower portion of the roots is less than one third the length of the roots. As yet another example, the lower portion of the roots is less than one quarter the length of the roots. As one example, the system will select watering frequency and duration for watering events based on the estimated root depth, vegetation type, and soil conditions (e.g., soil porosity, water capacity, etc.). For example, FIG. 2A illustrates an example of varying watering depths for an exemplary plant. Each line 144a-c represents the lower boundary of the saturation zone. The water saturation depth 140a-c varies based on numerous factors, such as, for example, soil conditions (e.g., type, porosity, density, moisture level, and the like), water volume (e.g., more water will saturate more of the soil creating a deeper lower boundary), watering duration (e.g., longer watering time provides more water that seeps deeper down into the pores creating a deeper lower boundary), and the like.

As shown in FIG. 2A, with the same soil conditions, water percolation depth varies based on water volume and watering duration for each watering event. For example, the water saturation depth 140a may result from a short watering duration and/or a low volume of water; the water saturation depth 140b may result from a long watering duration and/or a high volume of water; and the water saturation depth 140c may result from a watering duration and/or water volume that falls somewhere in between the respective watering duration or water volume of the other water saturation depths 140a and 140b.

As shown, different watering schedules for the same exemplary plant 142a-c result in different water saturation depths 140a-c within the soil 146. Each resulting lower boundary of saturation 144a-c has a position relative to the plant roots 148a-c. For example, the plant roots 148a of the first plant 142a extend below the lower boundary of saturation 144a. The watering schedule that generated this saturation zone is not ideal, as the portion of the roots 148a extending below the boundary 144a may not be able to access the deposited water. For the second plant 142b, the roots 148b are engulfed within the saturation zone and the lower boundary 144b extends a substantial distance below the roots 148b. For example, as shown in FIG. 2A, the lower boundary 144b extends to almost double the depth of the roots 148b. The watering schedule that generated this saturation zone is also not ideal, as the excessive water below the roots 148b cannot be utilized by the plant 142b and the vegetation is overwatered. For the third plant 142c, the lower portion of the roots 148c is engulfed by the saturation zone, but the lower boundary 144c extends only a small distance below the plant roots 148c. For example, the depth of the roots 148c is greater than three fourths of the water saturation depth 140c. The watering schedule that generated this saturation zone is preferable to the watering schedules for the first and second plants 142a,b, as the lower portion of the root is able to take up the surrounding water, without overwatering. By generating a watering plan that incorporates periods of stress with watering events that saturate the soil surrounding a lower portion of the root and extending just below the roots (e.g., based on estimated root depth), the roots are encouraged to grow with minimal wasted water, resulting in healthier vegetation with water conserved.

Figure 2B:
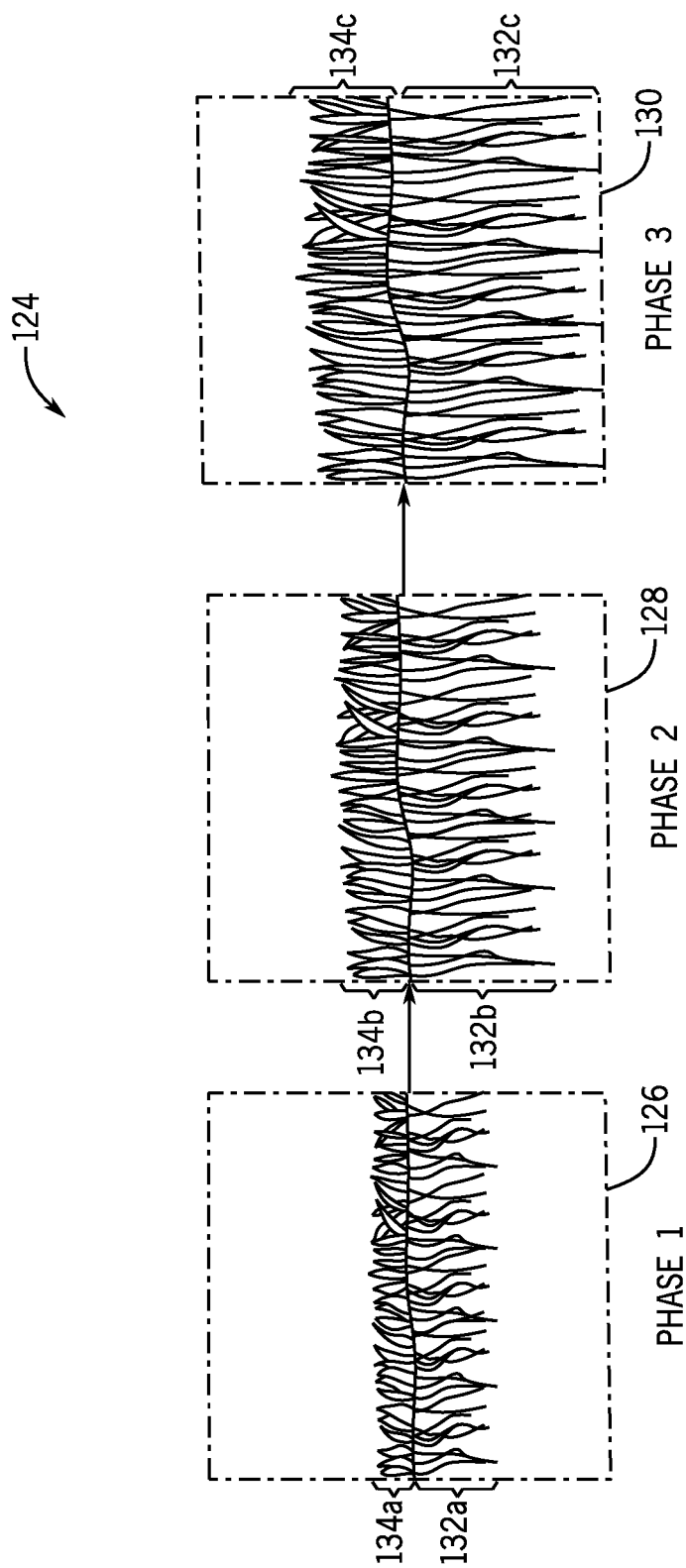
FIG. 2B is a diagram illustrating an example of changes in root depth over time as a watering plan is implemented by the watering system of FIG. 1.

FIG. 2B is a diagram illustrating an example of changes in root depth over time as a watering plan of the present disclosure is implemented. As shown, three phases of root growth are shown 126, 128, 130, each with a different root depth 132a-c; however, there may be any number of phases and root depths and those shown in FIG. 2B are meant as illustrative only. With reference to FIG. 2B, as the roots enter a new growth phase, the roots increase in length, and with this increased length, more water (e.g. longer watering duration and/or larger volume) is needed per watering event to sustain the vegetation. Each of these phases may provide an updated schedule and feedback to the system, such that the system takes into account the variations in root depth when determining the watering schedules.

In one embodiment, the watering plan is dynamically adjusted as the roots enter new growth phases. This adjustment may be made daily, weekly, or according to another timeframe, depending on root growth rate. The root growth rate may be estimated based on the watering schedule, growth rate of the vegetation (e.g., the change in vegetation height over time), or may be input (e.g., through sensor data, user feedback, or the like). In the example shown in FIG. 2B, Phase 1 126 may be the initial root state before the watering plan is implemented, Phase 2 128 may be the intermediate root state when the roots begin to grow as the training watering plan is implemented, and Phase 3 130 may be the desired root state achieved through the training watering plan. In this example, the root depth 132a is the estimated root depth value and the root depth 132c is the optimal root depth value. The root depth may be estimated based on the height of the vegetation. For example, the root depth may be three times the height of the vegetation. In this example, therefore, the root depth 132a can be estimated based on the height of the vegetation 134a. The amount, duration, and frequency of water provided at each phase 1-3 126, 128, 130 varies proportionally with the root depth 132a-c. For example, at phase 1 126, the vegetation 134a has the shortest root depth 132a and therefore requires less volume and a shorter duration of watering per watering event. Because the roots have a shorter root depth 132a, the roots will experience stress (e.g., dry out) more rapidly and therefore require a greater frequency of watering events.

As the root depth increases from root depth 132a at Phase 1 126 to root depth 132b at Phase 2 128, the watering plan is dynamically adjusted. Since the vegetation 134b has deeper roots 132b, the volume of water delivered per watering event is increased, e.g., by increasing the watering duration (length of time the sprinklers are on) and/or by activating additional sprinklers covering the same area. Because the roots have a deeper root depth 132b, the roots take longer to stress, allowing a longer time between watering events. As the root depth increases from root depth 132b at Phase 2 128 to the optimal root depth 132c at Phase 3 130, the watering plan is adjusted further. Since the vegetation 134c has deeper roots 132c, the volume of water applied per watering event (e.g., by increasing the watering duration) is increased while the frequency of watering events is decreased. In this example, since the optimal root depth 132c has been reached at Phase 3 130, a minimum watering volume or threshold (e.g., a desired low overall amount of watering sufficient to maintain the vegetation without wasted water) is reached and the watering schedule is within the sustainable or green zone.

Figure 3:
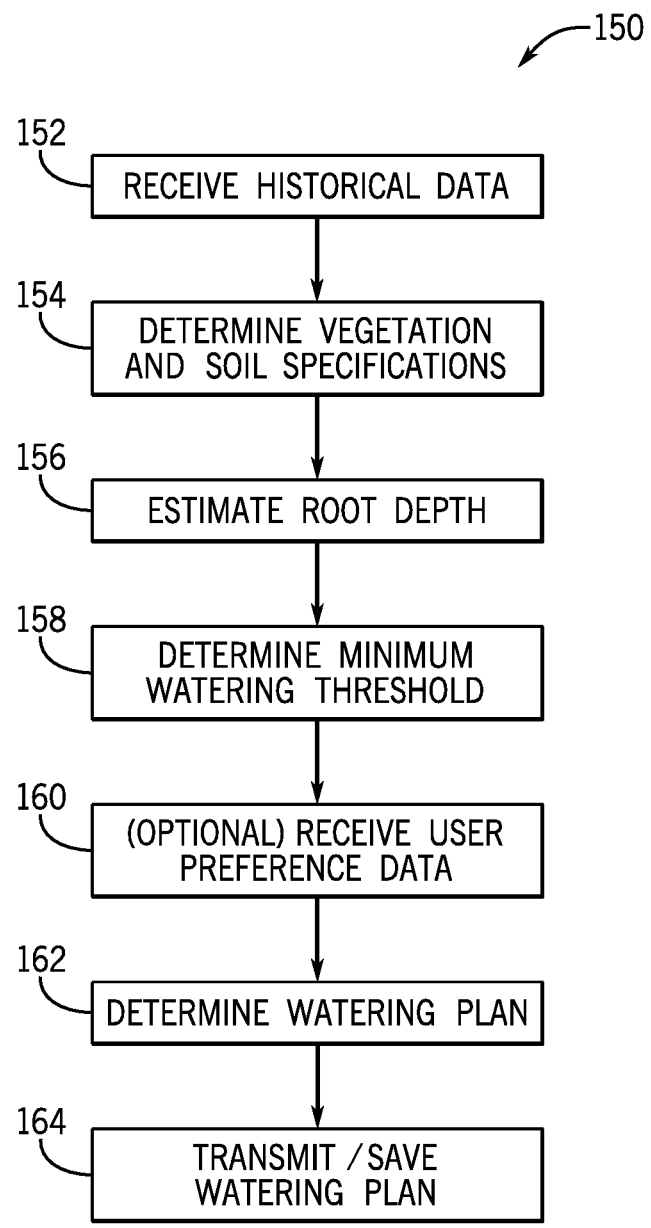
FIG. 3 is a flow chart illustrating a method to establish a watering plan.

FIG. 3 is a flow chart illustrating a method to establish a training watering plan executed by the sprinkler controller. The method 150 begins with operation 152 and the central controller or server 104 receives historical data relating to the vegetation and watering zone(s) or property. For example, the central controller or server 104 can receive historical data via network 114 from a user via a user device 108a, 108n or from a stored database. It is also contemplated that the server 104 may already have historical data stored if, for example, the watering system 100 has previously been used in the same watering area, e.g., same backyard. Historical data may include historical watering schedules, landscape usage (e.g., farming, irrigation, housing, recreation, etc.), weather variables (e.g., temperature, dew point, atmospheric pressure, etc.) and events (e.g., earthquakes, hurricanes, tornados, etc.), water supply and demand, and the like. Data relating to historical watering schedules may include such data as time of day of watering events, frequency of watering events, average amount of water used per watering event, average duration of watering per watering event, average amount of water used per square foot of vegetation, or the like.

With reference to FIG. 3, after operation 152, the method 150 proceeds to operation 154 and the central controller 104 receives data related to vegetation and soil specifications. For example, vegetation and soil specifications may be input entirely or partially by a user via a user device 108a, 108n, input automatically by image recognition (e.g., from video or image files from the sensor), or the like. For example, the user may capture images of the watering area and image detection algorithms may be executed to analyze the images for the vegetation types and coverage. As another example, a user may directly enter into the system from their user device the types of vegetation covering different watering zones or areas covered by a select sprinkler controller. It is contemplated missing data relating to vegetation and soil specifications may be received from a public database 116 or a database 116 stored within the system 100. In other words, the user may provide input generally related to the vegetation type (e.g., Kentucky Blue Grass) and the system may pull specific vegetation and/or soil characteristics from one or more vegetation/soil databases. Vegetation specifications may include vegetation type, cover, height, and density, among other data. Soil specifications may include soil type, composition, pack/density, porosity, water capacity, and moisture level and depth, among other data, and may be based on the geographic location of the sprinkler controller or user device. For example, the system may determine that the sprinkler controller is located at a particular latitude and longitude, and then retrieve the soil characteristics from a database based on that latitude and longitude. As another example, the user may input an address for the location of the sprinkler controller and using the city and state or zip code, the soil characteristics may be determined by referencing a soil characteristics database storing typical soil characteristics for city, state or zip code. As yet another example, the user may capture images of the soil, which may then be analyzed and compared to known soil features to determine soil characteristics.

After operation 154, the method 150 proceeds to operation 156 and the central controller 104 estimates the current vegetation root depth 132. For example, the central controller 104 can use one or more of received historical data (e.g., watering schedules, landscape usage, weather variables, frequency of watering events, and average amount of water used, etc.), vegetation data (e.g., type, height, cover, density, etc.), and soil data (e.g., type, composition, density, porosity, water capacity, moisture level and depth, etc.), to predict the root growth speed, determine the change in root depth overtime, and estimate the current root depth. As one example, the root depth can be estimated based on the height of the grass. In one embodiment, the system may estimate that the root depth is around 3 times the height of the grass. Utilizing a user input value of grass height or an image detection of the grass, the height of the grass is estimated by the processing element of the system and then with the grass height the estimate root value is determined, e.g., between 2-4 times the height of the grass. Other relationships may be used as well to determine the estimated root depth.

After operation 156, the method 150 proceeds to operation 158. In operation 158, the central controller 104 uses the estimated root depth 132 to determine a minimum watering threshold for a predetermined time period or number of watering events. In other words, the smallest water volume that the vegetation can receive over a selected period of time is determined. The minimum overall watering threshold may be selected based on the smallest amount of water necessary to maintain the vegetation at a healthy, sustainable level, where the amount may be determined based on per day or per week basis, e.g., X gallons every three days. A healthy, sustainable level may be based on 30 to 50 percent of the vegetation showing signs of wilt or thirst. Thirst is typically determined by analyzing folding leaf blades, blue-gray color, and impressions, such as footprints, remaining in the vegetation. A healthy, sustainable level may also be based on chlorophyll content. For example, satellite imagery of chlorophyll concentration may be measured to assess plant health. Because the length of the root correlates to the overall amount of water needed for the vegetation to survive (specifically a longer root requires less overall water since it can sustain longer periods of stress without watering), this minimum overall watering threshold can be calculated based on the estimated root depth 132.

As one example, the system may use the following equation:

Min. overall watering threshold (in.)=optimal root depth (in.)×min. overall water needed (in.)/in. of root In the above equation, the minimum watering threshold (in inches of water required per day/week/month/year/etc.) can be correlated to the smallest total amount of water needed per inch of root multiplied by the optimal root depth, where the optimal root depth is a calculated variable based on the change in the estimated root depth overtime. At a high level, by determining the estimated root depth, and determining the total water needed per inch of root, the system can estimate the minimum watering threshold and predict the total water needed for the current vegetation for the selected time period, e.g., every day, every three days, every 7 days, or the like. The time period may be selected as intervals used to select the watering schedule or may be separate therefrom.

With reference again to FIG. 3, after operation 158, the method 150 may proceed to operation 160 and the central controller 104 may receive user preference data from a user device 108a, 108n via the network 114. For example, a user may prefer lusher vegetation than that generated by watering the vegetation at its minimum watering threshold within the green zone. The user may desire to input this preference into the system during the training phase. In an alternative example, the user may first observe the appearance of the vegetation after the green zone watering plan is implemented, and then decide to adjust the green zone watering plan according to his or her preference. In one example, the green zone watering plan may be considered an eco mode, while the user-modified green zone watering plan may be considered a lush mode. In this example, a user can select either eco mode or lush mode on the user device 108a, 108n based on user preference. Other modes are contemplated to factor in different user preferences.

After operation 160, the method 150 proceeds to operation 162 and the central controller 104 determines the training watering plan. If no user preference data was received at operation 160, the central controller 104 generates a training watering plan at operation 162. The training or select watering plan may aim to water the vegetation within the green zone or within some other predetermined watering range. Based on the estimated root depth of operation 156, and the minimum watering threshold or minimum watering volume determined in operation 158, the central controller 104 builds a training watering plan to increase the root depth over time to allow reduced overall watering for the vegetation. The training watering plan may vary an amount of water distributed to the vegetation based on days of the week, times of day, or increments of time. For example, the training watering plan may allot a certain amount of water for 10 minutes at 6 am and a different amount of water for 10 minutes at 6 pm on Monday, Wednesday, and Thursday. As the root depth increases, and the roots become more drought resistant, the roots can better withstand water schedule adjustments, such that watering can take place at the most effective and efficient time of day.

If user preference data was received at operation 160, the user preference data is factored into the training watering plan to generate a user-modified training watering plan at operation 162 where the end watering amount may be increased above a minimum threshold. In other words, the modified watering plan may distribute a total watering volume near the green zone, but that is larger based on the user's preferences for the vegetation.

After operation 162, the method 150 proceeds to operation 164. In operation 164, the central controller 104 may store the training watering plan and transmit the plan via the network 114 to at least one of the controllers 102, 112 to implement the watering plan. It is also contemplated that the central controller 104 can store data collected and data generated at each operation of method 150 within one or more memory components 258 of a computing device 250 (See FIG. 12). Alternatively, in some embodiments, the controllers 102, 112 may themselves execute the various operations to generate the training watering plan and in these instances may locally save the plan for execution.

Figure 4:
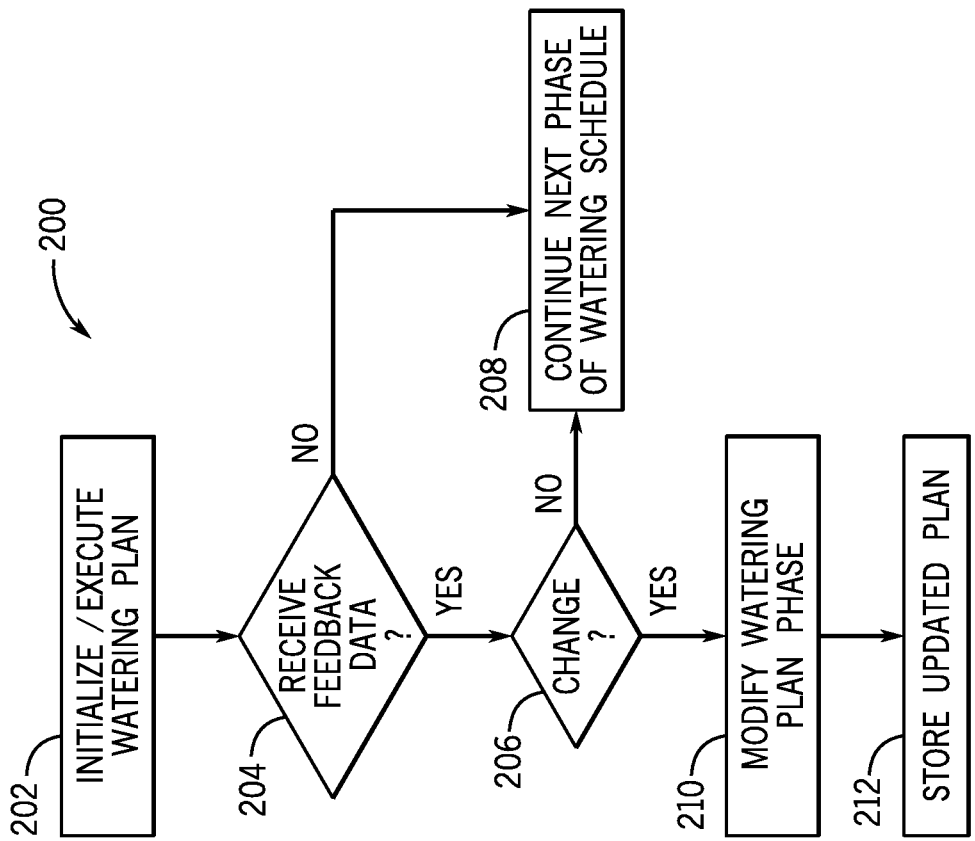
FIG. 4 is a flow chart illustrating a method for dynamically modifying a watering plan.

FIG. 4 is a flow chart illustrating a method for dynamically modifying a watering plan. After a watering plan is determined, such as in operation 162 in the method 150 of FIG. 3, the method 200 of FIG. 4 may maintain or modify the watering plan. The watering plan may be a training watering plan or the ultimate green zone watering plan. As discussed previously, the training watering plan delivers via the sprinklers selected volumes of water to train the roots to grow longer, allowing the vegetation to require less water. The green zone watering plan is the on-going or sustainable watering plan, i.e., the watering schedule applied when the roots have achieved an optimal or desired depth and may be selected to maintain the optimal or desired root depth. For example, when the roots have reached the optimal or desired depth, the watering plan may be selected so as to no longer aim to encourage root growth, i.e., the watering events may not be selected to reduce the water volume to encourage root growth; instead, the green zone watering plan may take into account other variables, such as, for example, local weather forecasts (e.g., precipitation forecasts, temperature forecasts, etc.), environmental events (e.g., hurricanes, rain storms, etc.), and the like, to ensure the overall watering maintains the roots at the optimal or desired depth (e.g., to ensure that the overall watering remains at the minimal overall watering threshold).

The method 200 begins with operation 202 and the watering plan is transmitted from the central controller 104 to at least one of the controllers 102, 112. The controllers 102, 112 may then implement the watering plan, e.g., selectively activate sprinkler heads to water one or more zones based on the watering times provided in the watering plan. The central controller 104 may control the time, day and frequency of such signals in accordance with the watering plan.

After operation 202, the method 200 proceeds to operation 204 and the central controller 104 receives feedback data to determine whether to continue implementing the watering plan or to modify the watering plan. Feedback data can be in the form of user preferences, programmed automatic feedback, new root depth measurement data, computer learning, or the like. In one example, feedback data can be provided by a user through a user device 108a, 108n. For example, if the user wants a lusher or greener lawn, the user can modify the watering plan through a user device, e.g., the user can select a "lush mode" in an application on the user's smart phone to modify a green zone watering plan to increase watering volumes, which will likely increase the green appearance of the lawn. In yet another example, specifications may be pre-programmed within the system 100, and one or more sensors can detect whether such specifications have been met and send feedback data to the central controller 104. The central controller 104 can then maintain or modify the watering plan accordingly in order to achieve the pre-programmed specifications. As an example, a user can program a desired vegetation coloration into the system 100. A camera can capture images of the vegetation, and the images can be analyzed to determine current vegetation coloration and send this data to the central controller 104, which can then process this information to determine if the current coloration matches the programmed coloration. If the current coloration does not match the desired programmed coloration, the central controller 104 will modify the watering plan accordingly to achieve the desired coloration.

Depending upon whether feedback data is received at operation 204, the method 200 will proceed either to operation 208 or to operation 206. If no feedback data is received, method 200 will proceed to operation 208 and continue to the next phase of the watering plan of operation 202 with no modifications. If the watering plan of operation 202 is the green zone watering plan, the central controller 104 will continue to implement a watering plan that aims to achieve a watering range within the green zone. If the watering plan of operation 202 is a predetermined watering plan, the central controller 104 will continue to implement a watering plan that aims to achieve a watering range near the green zone that incorporates any previously received feedback data, such as, for example, in operation 160 of FIG. 3.

If feedback data is received at operation 204, the method 200 will proceed to operation 206. In operation 206, the central controller 104 will determine whether the feedback data of operation 204 requires a change or modification of the watering plan. Depending upon whether the feedback data requires that the watering plan be changed, the method 200 will proceed either to operation 208 or to operation 210. As an example, feedback data will not require a change in the watering plan where the feedback data indicates that the current watering plan aligns with user preferences. For example, if a camera is used to detect vegetation coloration and the feedback data indicates that the current coloration matches the desired coloration, then the watering plan does not need to be changed and the method 200 would proceed to operation 208. If, however, the feedback data indicates that the current coloration is different from the desired coloration, then the watering plan would need to be modified to achieve the desired coloration and the method 200 would proceed to operation 210. If the central controller 104 determines a change in the watering plan is not necessary based upon the feedback data received, then the method 200 will proceed to operation 208 and continue to the next phase of the watering plan with no changes. If, however, the central controller 104 determines that a change is necessary based upon the feedback data received, then the method 200 will proceed to operation 210 and the central controller 104 will modify the watering plan.

In operation 210, the central controller 104 will modify the watering plan based upon the feedback data received. The modification can be either a slight or a major variation from the watering plan. The modification can also be either an increase or a decrease in water use. For example, if a green zone watering plan was implemented in operation 202, then a likely modification will be to increase the volume of water used, the duration of watering events, or the frequency of watering. As an example, if a user desires a lusher or greener appearance than that provided by implementing the green zone watering plan, the user may provide user feedback from a user device 108a, 108n, and the central controller 104 can then modify the watering plan to provide for more water allowance to cultivate lusher vegetation.

As an alternative example, if a predetermined watering plan was implemented in operation 202, then the central controller 104 may modify the watering plan to increase total water used or it may modify the watering plan to implement a green zone watering plan, using less overall water and aiming to achieve a watering level within the green zone. For example, if in method 150 of FIG. 3, the central controller 104 received user preference data in operation 160, the predetermined watering plan may already aim to achieve a total watering range above the green zone. The user may provide additional feedback at operation 204 of method 200 to the central controller 104 indicating a desire to reduce water consumption. The central controller 104 could use this feedback to modify the watering plan to use less overall water in operation 210 of method 200. If, as another example, the user provides additional feedback to the central controller 104 at operation 204 indicating a desire to have even lusher vegetation (a desire for a change at operation 206), then the central controller 104 would use this feedback to modify the watering plan to use even more overall water in operation 210 of method 200.

After operation 210, the method 200 proceeds to operation 212. In operation 212, the central controller 104 stores the updated watering plan as the current watering plan. The central controller 104 may store this data within internal or external memory components.

Figure 5:
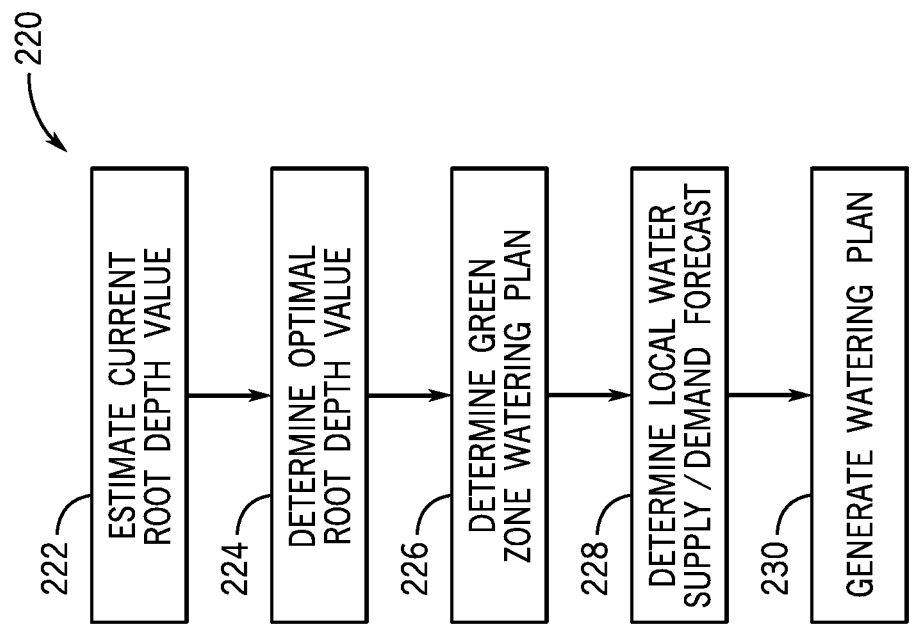
FIG. 5 is a flow chart illustrating an example of potential data inputs to generate a watering plan.

FIG. 5 is a flow chart illustrating an example of utilizing landscape or yard characteristic inputs to generate a watering plan. The method 220 begins with operation 222 and the central controller 104 estimates or receives the current root depth value. For example, various data may be analyzed to estimate a root depth value, including, among other things, at least one of historical watering data, vegetation specifications, and soil specifications. As another example, root depth may be measured directly by a user or by a sensor and input into the system 100. For example, a user may measure root depth for a sample of the vegetation and input the measurement into the system 100 via a user device 108a, 108n. In this example, the system 100 may extrapolate this measurement data to estimate the root depth for the entire vegetation plot (e.g., based on vegetation type, cover, soil conditions, etc.).

After operation 222, the method 220 proceeds to operation 224 and the central controller 104 determines the optimal root depth value. The optimal root depth value may be the depth at which the root is drought resistant, such that the root can sustain the vegetation at its minimum watering threshold, or another predetermined root depth. The optimal root depth value is determined based upon different variables, such as, among other things, the current root depth, the vegetation and soil specifications, and environmental factors, and may include user preferences.

After operation 224, the method 220 proceeds to operation 226 and the central controller 104 determines the green zone watering plan. The green zone watering plan is correlated to the optimal root depth. The green zone watering plan may include a reduced watering event frequency and/or reduction of watering volume levels, while maintaining the vegetation at a minimum watering threshold based on the optimal root depth. The green zone watering plan can be achieved by reducing the frequency of watering events, increasing the time between watering events, and increasing the watering volume/duration per watering event over time as the current root depth grows to achieve the optimal root depth. The central controller 104 generates a watering plan incorporating changes in watering volume and frequency over time as the roots grow.

After operation 226, the method 220 proceeds to operation 228 and the central controller 104 receives data on local water supply and demand forecasts. For example, the central controller 104 may receive water supply and demand forecasts from a weather service, third party, or the like. Water supply and demand forecasts can be received by the day or by the hour to assist in determining an acceptable moisture level range.

After operation 228, the method 220 proceeds to operation 230 and the central controller 104 generates a watering plan. Data collected in operations 222, 224, 226, and 228 are factored into the watering plan. For example, the initial overall watering volume can be dynamically adjusted over time to achieve the green zone watering plan (e.g., the minimum watering threshold) for the optimal root depth value. This adjustment can take place hourly, daily, or weekly. The water supply and demand forecast may be taken into account to achieve a watering plan allowing efficient watering while still protecting the local water resources. As an example, where water supply is high and demand is low, the total amount of water applied to the vegetation can be increased. As another example, where water supply is low and demand is high, the total amount of water applied to the vegetation may be reduced. For example, if a user enters a user preference for lush mode as opposed to eco mode, which allows for watering above the green zone, the total amount of water applied in excess of the green zone may be higher or lower depending on local water supply and demand forecasts.

The central controller 104 may continuously evaluate the root depth in the manner described previously and determine whether the watering times, frequency, and/or days should be varied. If the central controller 104 determines that the watering plan should be updated, the central controller 104 may store the updated watering plan and/or transmit the updated watering plan via the network 114 to at least one of the controllers 102, 112.

Figure 6:
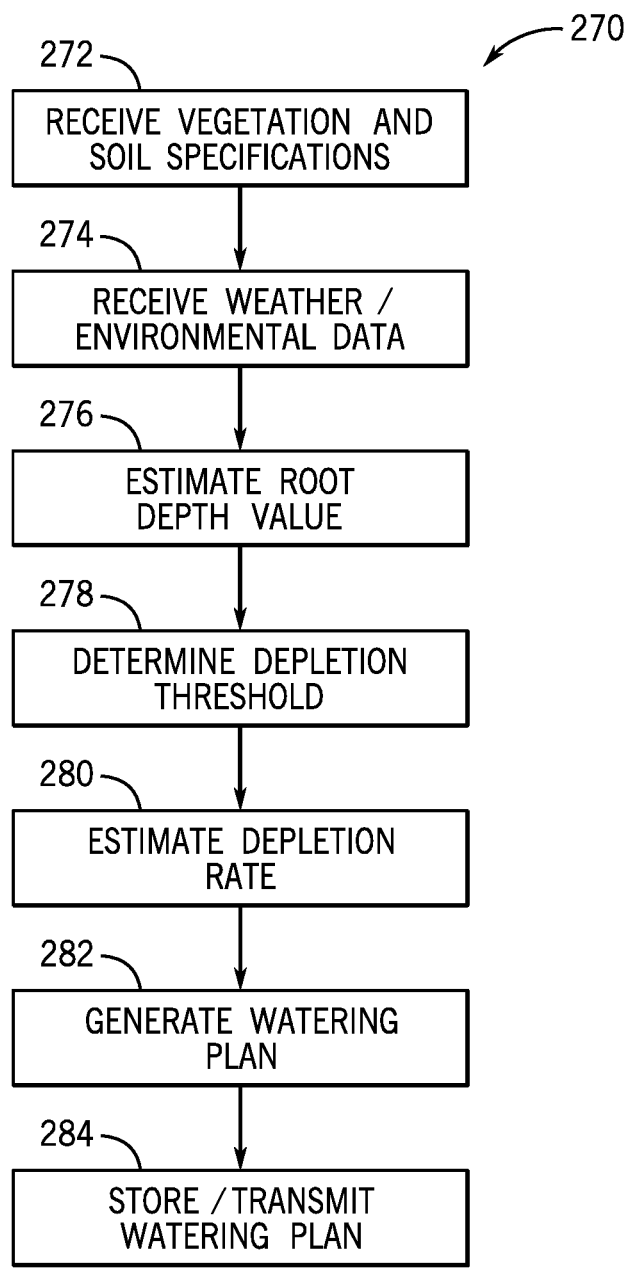
FIG. 6 is a flow chart illustrating a method to establish a watering plan.

FIG. 6 is a flow chart illustrating a method to establish a watering plan. The method 270 begins with operation 272 and vegetation and soil specifications are received. Vegetation specifications may include vegetation type, cover, height, and density, among other data. Soil specifications may include soil type, composition, pack/density, porosity, water capacity, and moisture level and depth, among other data. Vegetation and soil specifications may be input, for example, entirely or partially by a user via a user device 108a, 108n, input automatically by image recognition (e.g., from video or image files from the sensor), or the like. It is contemplated missing data relating to vegetation and soil specifications may be received from a public database 116 or a database 116 stored within the system 100.

After operation 272, the method 270 proceeds to operation 274 and weather and/or environmental data is received. Weather data may include, for example, precipitation, humidity, atmospheric pressure, temperature, weather events (e.g., hurricane), and the like. Weather data may include historical weather patterns and/or current weather forecasts. Environmental data may include, for example, sun exposure, landscape use, landscape age, historical watering patterns (e.g., historical duration, frequency, and volume of watering events), and the like. The weather and/or environmental data may be input into the system 100 by a user, by one or more sensors (e.g., a thermometer, barometer, etc.), or via one or more databases. For example, the weather data may be received from a third party database that monitors and stores weather data. As another example, the historical watering patterns may be received from an internal database associated with the system 100.

After operation 274, the method 270 proceeds to operation 276 and the current root depth value is determined (e.g., by actual measurements taken from a soil sample) or estimated. The root depth value may be estimated based on one or more of the vegetation data, soil data, weather data, and environmental data collected at operations 272 and 274. As one example, the root depth can be estimated based on the height of the grass. For example, the root depth may be about 3 times the length of the grass.

After operation 276, the method 270 proceeds to operation 278 and the water depletion threshold is determined. The water depletion threshold is the maximum amount of allowed water depletion from the soil to stress the roots but enable survival of the vegetation. The water depletion threshold corresponds to an amount of stress allotted to the vegetation (e.g., a greater water depletion threshold provides more stress to the vegetation). The amount of stress allotted to the vegetation may depend on root depth, such that the water depletion threshold may be determined based on the current root depth estimated at operation 276. For example, the water depletion threshold (e.g., allotted stress) may be greater for longer roots. For example, the water depletion threshold may be 50% or more, 60% or more, 70% or more, 80% or more, 85% or more, 90% or more, 95% or more allotted water depletion. The water depletion threshold may also depend on the yield curve of the vegetation. In these instances, the yield curve may also be factored into the determination of the water depletion threshold. For example, depending on the yield curve and the time of year for the vegetation, the water depletion can be reduced as the vegetation may be expected to be in a slow growth period based on the yield curve or vice versa.

After operation 278, the method 270 proceeds to operation 280 and the water depletion rate is estimated. The water depletion rate is the amount of water depleted from the soil over time. The water depletion rate may depend on several factors, such as, for example, soil water content, soil porosity/density, atmospheric pressure and humidity, temperature, evapotranspiration (ET), and the like. For example, the water depletion rate may be greater with less soil water content, greater soil porosity, lower pressure and humidity, and a higher temperature. The water depletion rate may vary based on the time of year. For example, warmer and drier months/seasons (e.g., summer) may have a faster water depletion rate. As one example, ET may be calculated using the Penman-Monteith equation and then used to determine an amount of water depletion.

After operation 280, the method 270 proceeds to operation 282 and a watering plan is generated. The watering plan may be generated to increase root depth based on the data collected at operations 272 and 274, the estimated or actual current root depth, the determined water depletion threshold, and the estimated water depletion rate. For example, the water volume allotted per watering event may correspond to the root depth (e.g., a larger volume of water may be used to water the larger volume of soil that surrounds deeper roots). The volume of water allotted may depend on soil characteristics such as, for example, soil porosity, water capacity, water content, and the like, and weather and environmental factors that affect the water content of the soil. As another example, the training time (e.g., non-watering time between watering events), which corresponds to a period of stress, may be determined based on the water depletion threshold and the estimated water depletion rate. For example, the training period may be longer with a greater water depletion threshold. For example, a training period may last until the water in the soil has depleted to a certain level (e.g., depleted by 80% or more). The training period may also be longer if the water depletion rate is low (e.g., since it takes longer for the water in the soil to deplete to the threshold depletion level). Because the water depletion rate may vary depending on the time of year (e.g., cooler and damper months may have a low depletion rate), the training period may also vary depending on the time of year. With longer training periods, the frequency of watering events may be decreased.

After operation 282, the method 270 proceeds to operation 284 and the system 100 may store the watering plan and transmit the watering plan via the network 114 to at least one of the controllers 102, 112 to implement the watering plan. It is also contemplated that the system 100 can store data collected and data generated at each operation of method 270 within one or more memory components 258 of a computing device 250 (See FIG. 12). Alternatively, in some embodiments, the controllers 102, 112 may themselves execute the various operations to generate the watering plan and in these instances may locally save the plan for execution.

Soil Enhancement Kit

Figure 7:
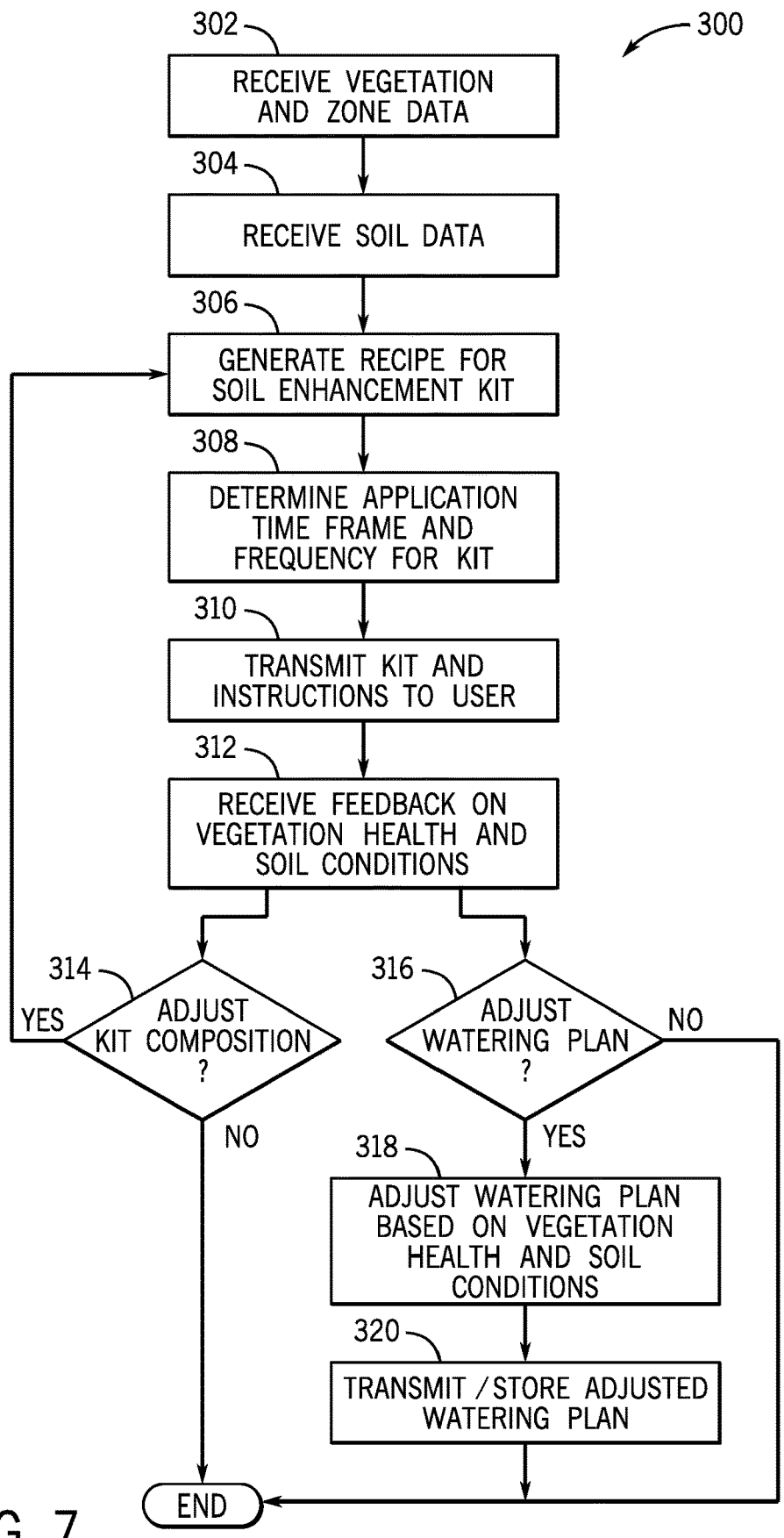
FIG. 7 is a flow chart illustrating a method to generate and apply a soil enhancement kit to improve vegetation health and reduce overall water consumption.

FIG. 7 is a flow chart illustrating a method to generate and apply a soil enhancement kit to improve vegetation health. The method 300 begins with operation 302 and vegetation and zone data are received. Vegetation data may include vegetation type (e.g., species), location, root depth, crop coefficient, yield curve, density, cover, height, color, chlorophyll content, and the like. Vegetation data may be input by a user or determined by the system 100. For example, a sensor 106 may monitor data related to vegetation characteristics and input the data into the system 100 for processing. As one example, the sensor 106 may be an optical sensor and may capture an image of the vegetation. As another example, the sensor 106 may be a soil sensor that detects soil moisture levels. The system 100 may be able to assess differences in color of the vegetation, the percent cover of the vegetation, the species of the vegetation, the height of the vegetation, yield curves, the root depth, and the like.

Zone data may include landscape or area location (e.g., latitude and longitude), use, age (e.g., less than one year old, 2 years old, 5 years old, 10 years old, 20 years old, etc.), size, maintenance, watering data, and the like. For example, landscape use data may include type of landscape use (e.g., farm land, residential, communal, etc.), how frequently the landscape is used (e.g., rarely, often, daily, weekly, etc.), the intensity of use (e.g., heavy vs. light), and the like. For example, the landscape may be a front yard and may rarely be used. As another example, the landscape may be a back yard and may be used often for children to play and animals to roam. Landscape size data may include acreage, coverage area, and the like. In some examples, the landscape size may be an average zone size based on zone data of surrounding areas. In some examples, the landscape size may be an arbitrary number (e.g., 500 sq. ft.) or may be determined from a database storing landscape size data. Landscape maintenance data may include data related type of maintenance, maintenance timing, frequency of maintenance, and the like. Maintenance may include mowing, mulching, bagging, applying fertilizer, planting, weeding, and the like. Watering data may include current and historical watering patterns (e.g., watering frequency and duration). Zone data may also include weather data (e.g., precipitation and/or wind patterns).

The zone data may be received from a user, from the system 100, or from a third party database. As one example, a user may input one or more of the zone data into the system 100. For example, the user may input the frequency and type of activity taking place in the yard (e.g., kids play every afternoon in the backyard, a dog is allowed to roam in the fenced in backyard, no one uses the front yard, etc.). As another example, a sensor may collect one or more of the zone data and input the collected data into the system 100. For example, a sensor (e.g., motion sensor, camera, etc.) may monitor landscape use/maintenance and input the landscape use/maintenance data to the system 100. As another example, the landscape size/area may be received from a user, a third party database, or determined by the system. For example, an image of the yard may be captured (e.g., by a camera) and uploaded by a user, and the system may estimate the area of the yard based on the image. For example, the system may trace a polygon around the yard and determine the measurement of the enclosed area. As another example, the landscape may be divided into various zones, each with a mapped area, and the system 100 may be able to determine the total landscape area by adding the zone mappings together. As yet another example, the landscape size may be retrieved from a third party database (e.g., property records) and determined, for example, based on square footage of the house and lot size. As another example, the weather data may be received from a third party database that monitors and stores weather data. Alternatively or in addition, the system 100 may determine weather data based on data collected from sensors monitoring weather (e.g., a thermometer, barometer, etc.).

After operation 302, the method 300 proceeds to operation 304 and soil data is received. Soil data may include soil type, density, porosity, moisture level, temperature, and the like. The soil data may be received from a user, from the system 100, or from a third party database. For example, a third party database may provide soil temperature data based on the location of the landscape area (e.g., the latitude and longitude). As another example, a sensor 106 (e.g., thermometer, camera, etc.) may determine certain soil characteristics (e.g., temperature, porosity, etc.) and input them into the system 100. As yet another example, a user may take a soil sample (e.g., via a soil probe or plug) and provide the system 100 with various measurements related to the soil characteristics. As one example, the user may upload an image of the soil sample and the system may use image recognition techniques to analyze the soil sample. For example, an image recognition technique may use feature extraction based on spatial features, edge detection, boundary extraction, contour following, shape features, textures, and the like. With such techniques, various characteristics of the soil may be determined, such as, for example, grain size and distribution, voids (e.g., pores), nutrient content, pH level, water content, and the like.

After operation 304, the method 300 proceeds to operation 306 and a recipe is generated for a soil enhancement kit. The soil enhancement kit includes one or more components or consumables that, when applied to the soil, improve overall landscape health (e.g., improve soil conditions and vegetation health). For example, certain components may be included that help to open the soil in order for the soil to better retain water, encouraging root growth. The soil enhancement kit may include one or more of the following components, in any combination: macronutrients (e.g., nitrogen, phosphorus, potassium, etc.), micronutrients (boron, copper, iron, manganese, molybdenum, zinc, nickel, chloride, etc.), fertilizer, soil conditioner, weed control, wetting agent, bio stimulant, bacteria, fungi, organic matter, plant hormones, and the like. In some examples, the kit may include synthetic fertilizer. In other examples, the kit may include organic matter and one or more fungi and/or bacteria. For example, a particular combination of fungi and/or bacteria may consume particular organic matter to make certain nutrients available to the vegetation. In several embodiments, one or more components in the soil enhancement kit are liquid. For example, the entire soil enhancement kit may be liquid. However, it is also contemplated that one or more components may be solid (e.g., a powder). The amount and type(s) of the one or more components included in the kit may be varied based on data related to the landscape. For example, the landscape data may include information on vegetation characteristics, current vegetation health (including, for example, current vegetation and soil conditions) and target vegetation health, local weather, seasonal changes, climate, historical watering patterns, current watering plan, and the like.

The vegetation characteristics may be used to determine the components of the soil enhancement kit and the component amount. For example, nutritional demand may vary based on the vegetation species. Vegetation species nutritional demand may be determined, for example, from a database. The required nutrients may be included with the soil enhancement kit or one or more microbes may be included that help mobilize the required nutrients already within the soil. For example, different bacterial or fungal species may mobilize different nutrients. The bacterial and/or fungal species included with the kit may be selected based on the nutrients required by the vegetation species. As another example, the amount of nutrient or bacterial and/or fungal species included may vary based on vegetation cover and landscape area.

The current landscape health can be determined based on at least one of the data collected at operations 302 and 304. For example, greater landscape use may disrupt the soil and hinder vegetation growth, resulting in less durable soil and a more unhealthy land. As another example, the age of the soil and vegetation may reveal general information about activity and stabilization of the soil. For example, landscape with younger characteristics, e.g., with recent landscaping (e.g., less than a year old), may have new sod that does not have much depth, nutrition, or microbial activity, while landscape with older characteristics (e.g., 10 years old) may have better depth, nutrition, and well-established microbial activity and may therefore be healthier. Different maintenance techniques may also have varied impact on the soil. For example, whether the vegetation is bagged or mulched may vary the nutrients in the soil as bagging may remove soil nutrients, while mulching may add nutrients into the soil. As another example, current and historical watering patterns may be indicative of vegetation health and soil conditions. For example, historical overwatering may indicate shorter root depth and high soil moisture levels. As yet another example, excessive precipitation may result in runoff, which can affect the ability of the soil to retain nutrients.

Based on the determination of the current landscape health (e.g., estimated durability, condition of nutrients, microbes, and other soil conditions), the components of the kit can be determined to achieve the desired or target landscape health. In some embodiments, the system may determine soil deficiencies (e.g., deficiencies in composition (e.g., nutrients, microbes, etc.), in moisture, in porosity, and the like), and provide the deficient soil components, or remedies for the deficient components, with the kit. For example, if nitrogen is deficient (e.g., nitrogen has been removed from the soil through bagging, runoff, or the like), then nitrogen and/or particular microbes may be included in the kit. On the other hand, if nitrogen has been added to the soil through mulching, then the system may determine the soil has sufficient nitrogen and omit this component from the kit. In some cases, nitrogen may also be reduced in the kit based on the age of the soil. For example, more mature soil likely has more stable, self-contained microbes, and therefore requires less nitrogen. As another example, if the ground is rarely weeded, then a weed controller may be included in the kit. The amount of each component in the kit will depend on, among other things, the size of the landscape and the vegetation coverage and type.

After operation 306, the method 300 proceeds to operation 308 and the application time frame and frequency for the kit is determined. There may be a specific window of time that is optimal to apply the kit. For example, timing of application may depend on soil conditions. As one example, the ground temperature may need to reach a certain threshold temperature for the kit to be applied. As discussed above, the ground temperature may be determined by a sensor 106 or by a third party database (e.g., based on weather at the location or typical ground temperatures based on time of year for that location). Once the ground reaches the threshold temperature, the kit can be applied. The window of time for kit application may be defined by the ground temperature. For example, the kit may be applied when the ground temperature is within a certain range, and when the ground temperature falls outside the range, kit application is no longer recommended. In this manner, the temperature may create a start and stop time for kit application. The components of the kit may be applied at once or at different times (e.g., staggering application). For example, two or more kit components may thrive at different soil temperatures, such that the components are applied at different times based on the ground temperature. The kit may include multiple doses (e.g., in separate individual packages) that can be applied at different times. For example, the doses may be applied daily, weekly, or monthly, depending upon the specific needs of the land. The application timing and frequency may also depend on the type of vegetation (e.g., the species). For example, different vegetation species may require different amounts of particular nutrients, such that some vegetation types may require a greater frequency of nutrient application than other vegetation types.

After operation 308, the method 300 proceeds to operation 310 and the kit and kit instructions are transmitted to a user. The kit instructions may include information on when and how to apply the kit. For example, the instructions may include information on the time window, frequency, and/or duration of application, the amount to apply, and the location to apply the kit in (e.g., if the landscape has various types of vegetation). For example, the frequency of application may depend on vegetation type/species. For example, the kit may need to be applied every week, every two weeks, every other week, etc. based on the type of vegetation.

The kit may be transmitted to the user as an individualized packet. The kit may include only a single application (e.g., single dose) or multiple applications/doses. The amount of doses provided in the kit may vary based on the lifespan of the kit contents (e.g., based on the type of component, the potency of the components over time, etc.). For example, only a single dose may be provided per kit where the kit contents have a short lifespan (e.g., quickly lose potency). For example, certain microbes may only last within the kit a certain amount of time. The kit may include an amount sufficient for the entire landscape area. In some embodiments, one or more components of the kit may be divided into separate packets for separate application. For example, one component may be applied and, after an activation period for the first component, as discussed in more detail below, one or more other components may be applied. For example, bacteria may be applied first and, after a colonization period, a fungus may be applied.

In some embodiments, the kit may be sent to the user when the kit needs to be applied. For example, when the system 100 determines the ground temperature has reached the applicable temperature range (e.g., the temperature appropriate for kit application), the system 100 may transmit the kit to the user, e.g., the system may schedule the kit to be delivered (e.g., by mail or other delivery) to the user's mailing address or other location. In these embodiments, the system 100 may be selected to arrange delivery of the kit to the user a week, a day, or a few hours before the kit needs to be applied. Alternatively, the kit may be sent to the user when generated, and the instructions may indicate when the kit needs to be applied. In some embodiments, the kit may be sent at set intervals of time to the user. For example, depending on the number of doses provided in each kit, the lifespan of each kit, the landscape area, and the individual landscape health needs, the amount of time between each kit shipment may be determined. For example, a kit may be shipped to a user once a week, every two weeks, once a month, every two months, once a year, etc.

After operation 310, the method 300 proceeds to operation 312 and feedback on vegetation health is received. Generally, the vegetation health will improve over time as the soil enhancement kit is applied. For example, the soil enhancement kit may increase the available water in the soil, the crop coefficient, and the yield curve. The timeframe for vegetation health improvement may correspond to an activation period, e.g., a time over which the one or more components of the soil enhancement kit or the one or more byproducts of the soil enhancement kit (e.g., mobilized nutrients) are introduced and have an impact on the surrounding environment). For example, the activation period may be an inoculation period (e.g., time for association with the plant and/or absorption by the plant), an incubation period (e.g., time for microbe incubation/colonization), a mobilization period (e.g., period over which immobilized nutrients become mobilized), and the like. As one example, where the soil enhancement kit includes one or more fungi, the fungus may extend the reach of the roots into the surrounding soil as the roots are colonized by the fungus over an inoculation or colonization period. For example, mycorrhizal fungi colonize plant roots, helping solubilize phosphorus and bring soil nutrients and water to the plant. Mycorrhizal fungi enhance nutrient update of the roots by increasing the surface absorbing area of roots and releasing chemicals into the soil that dissolve complex soil nutrients (e.g., phosphorus, iron, etc.). For example, one group of mycorrhizae, endomycorrhizae, grow within root cells and are commonly associated with grasses, row crops, vegetables, and shrubs. In this manner, vegetation health may be predicted to improve over a colonization period.

Feedback received at operation 312 may be received from a user or from the system 100. For example, a user may desire a lusher, greener lawn and send a request to the system 100 for an additional kit or additional kit components. As another example, the system 100 may monitor the health of the landscape over time and provide feedback. As one example, one or more cameras may be placed on the landscape and may capture image data. The image data may be sent to the system 100 for image processing. The system 100 may process the image to determine vegetation color, chlorophyll content, height, root depth, soil density/porosity, and the like. As another example, other sensors 106 may be used to monitor other characteristics, such as soil moisture levels, nutrient levels, microbial activity, and the like. The system 100 may use the collected data to determine overall landscape health. For example, greener and higher vegetation with greater chlorophyll content and a longer root depth may indicate overall healthy landscape, while browner, shorter vegetation with less chlorophyll content and shorter root depth may indicate overall unhealthy landscape.

In some embodiments, the feedback received at operation 312 may include data related to the implementation of the soil enhancement kit (e.g., whether the kit was applied, when the kit was applied, whether kit application followed the instructions, etc.). This feedback may be provided by a user or by the system 100 (e.g., a sensor may detect application data (e.g., occurrence, rate of application, amount of application) and send this data to the system 100). The system 100 may determine landscape health status based on whether, how, and when the kit was applied.

After operation 312, the method 300 proceeds to operation 314 and the system 100 determines whether to adjust the kit composition. For example, based on the feedback on current overall landscape health or desired landscape health, the kit may need to be adjusted. For example, if overall landscape health is improving, then the soil may require fewer additives/supplements. As another example, if the user desires a lusher lawn than provided by the current kit generated at operation 306, then the kit may be adjusted to include more additives/supplements. If the kit composition needs to be adjusted, then the method 300 proceeds to operation 306 and a new recipe is generated for the soil enhancement kit. If the kit composition does not need to be adjusted (e.g., the current landscape health has reached the desired landscape health), then the method 300 ends.

After operation 312, the method 300 also proceeds to operation 316 and the system 100 determines whether to adjust the dynamic watering plan. As previously discussed, the dynamic watering plan may depend on several factors related to vegetation health and soil conditions. For example, the factors may include root depth, chlorophyll content, crop coefficient, yield curve, soil water capacity, soil water content, soil water depletion rate, soil water depletion threshold, soil temperature, and the like. An applied product (e.g., a soil enhancement kit) and an activation period may impact these factors, altering vegetation health and soil conditions and resulting in a need to adjust the watering plan accordingly. For example, vegetation health may improve over or after an activation period after application of an applied product (and, in some cases, after an initial watering event), and the watering plan may be adjusted as vegetation health improves. Therefore, the watering plan may be adjusted based on the activation period. As one example, application of the soil enhancement kit may increase soil porosity enabling roots to grow deeper. For example, application of a soil conditioner from the kit will help to aerate the soil, creating space beneath the soil for the roots to grow. Longer roots take up a greater volume of soil, requiring an increased volume of water to fully submerge the lower portion of the roots to allow the roots to grow even deeper. Further, longer roots can survive with greater water depletion, such that the allowed water depletion threshold can be increased, as discussed in more detail below. In this example, the increased root length results in a need to adjust the dynamic watering plan.

As another example, the soil enhancement kit may alter the soil water capacity, water content, water depletion rate, and the like. For example, the kit may increase the soil water capacity and water content, which may result in a decreased water depletion rate (e.g., a longer time is required for the increased water content in the soil to deplete). The watering plan may include training periods (e.g., non-watering periods) that are based on the water depletion rate and a water depletion threshold. The water depletion threshold is the amount of water that is allowed to deplete from the soil (e.g., prior to watering). The water depletion threshold corresponds to an amount of stress allotted to the vegetation (e.g., a greater water depletion threshold provides more stress to the vegetation). The amount of stress allotted to the vegetation may depend on root length or depth, such that the water depletion threshold may be determined based on root length or depth. For example, the water depletion threshold (e.g., allotted stress) may be greater for longer roots. The training period, which corresponds to a period of stress, may be increased for longer roots that have a greater water depletion threshold. For example, a training period may last until the water in the soil has depleted to a certain level (e.g., depleted by 80% or more). If the water depletion rate decreases, for example, then the training period may last longer (e.g., since it takes longer for the water in the soil to deplete to the threshold depletion level). In this example, the dynamic watering plan may need adjustment with an increase in soil water capacity and water content and a decrease in the water depletion rate.

If the system 100 determines at operation 316 that the watering plan does not need adjustment, the method 300 ends. If the system 100 determines at operation 316 that the watering plan needs adjustment, the method 300 proceeds to operation 318 and the watering plan is adjusted based on the determined vegetation health and soil conditions. For example, if, as discussed above, root depth increases with kit application, the watering plan may account for this increased root depth by increasing watering volume for each watering event. As another example, if, as discussed above, the soil water depletion rate decreases with kit application, the watering plan may account for this decreased water depletion rate by increasing training time between watering events and therefore reducing the frequency of watering events.

After operation 318, the method 300 proceeds to operation 320 and the central controller 104 stores the adjusted watering plan as the current watering plan. The central controller 104 may store this data within internal or external memory components.

In an alternate embodiment, a user may apply additives to the soil as an alternative to or in addition to the soil enhancement kit. For example, the additional or alternate additives applied by a user may be considered when determining the soil enhancement kit composition (e.g., at operation 306) and whether to adjust the watering plan (e.g., at operation 316). For example, a user may separately purchase fertilizer from a third party to apply to his or her yard. The user may input any soil additives applied to the soil into the system. For example, the user may manually enter additive (s) applied (e.g., fertilizer ingredients based on a label or the product name), scan a barcode on the product, upload an image of the additive(s) (e.g., capture and upload an image of an ingredient label or the product name), and the like. In some examples, the system may be linked to a third party database to gather additional information on the additives applied. For example, where the user inputs the product name or scans a barcode, the system may gather additional information on the product components through the third party database. In some embodiments, scanning a barcode or uploading an image of an additive creates an event that signals to the system that an additive was applied to the soil.

Figure 8:
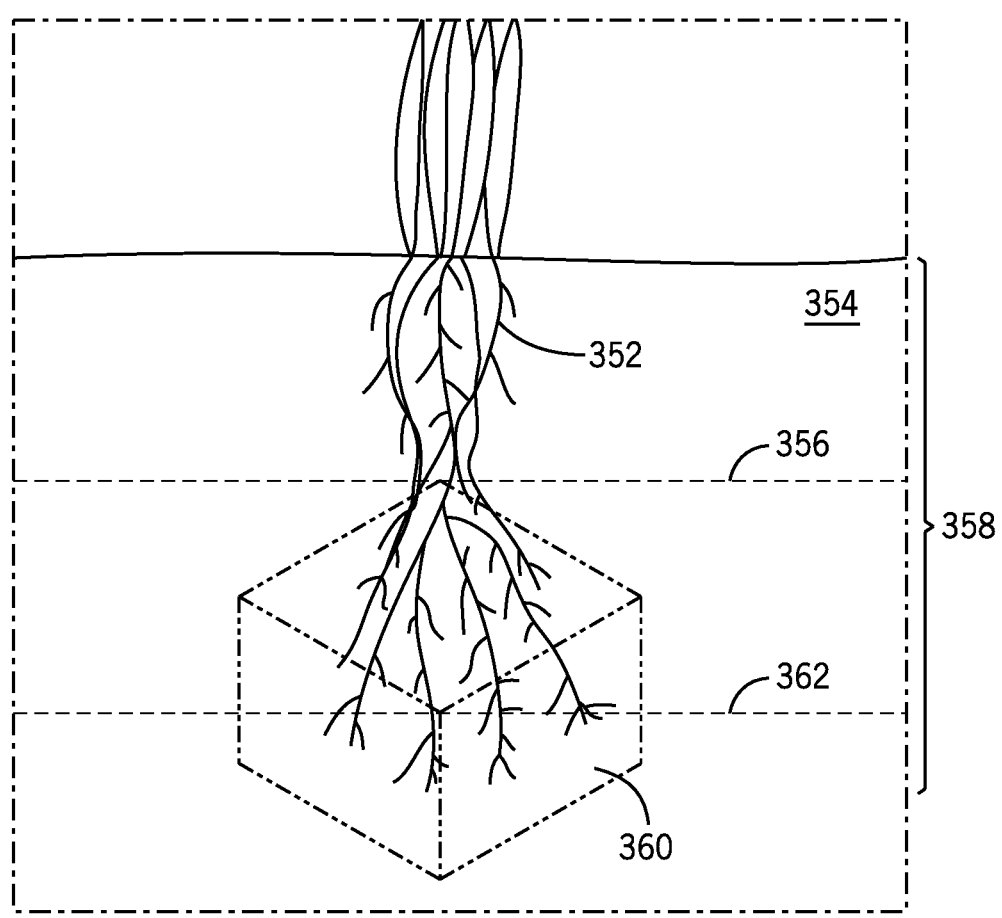
FIG. 8 is a diagram illustrating an example of a deep root ecosystem created by the system of FIG. 1.

FIG. 8 is a diagram illustrating an example of a deep root ecosystem created by the system of FIG. 1. As shown, roots 352 have grown to a depth 358 within the soil 354. The roots 352 grow both down and out in various directions, taking up a 3D volume within the soil 354. Water is allowed to deplete to the water depletion line 356. In other words, water above the water depletion line 356 is allowed to deplete from the soil 354 until the water level reaches the water depletion line 356, at which point more water may be applied to the soil 354. As shown, the water depletion line 356 is 50% the depth 358 of the roots 352; however, it is contemplated that the water depletion line 356 may be greater than 50% the depth of the roots, such as, for example, between 60% and 70% the depth of the roots 352. The water depletion line 356 is at a shallower depth within the soil 354 than the wilting point 362. The wilting point 362 occurs when too much water is allowed to deplete, depriving the roots of water and resulting in wilting.

As shown in FIG. 8, a three dimensional volume surrounding a lower portion of the roots 352 forms a deep root ecosystem 360 around the roots 352. The deep root ecosystem 360 may include water and one or more soil additives (e.g., components of a soil enhancement kit) applied to the soil, as discussed above. For example, the deep root ecosystem 360 may include one or more micronutrients, macronutrients, bacteria, fungi, plant hormones, and other bio stimulant or organic matter, in a desired combination (e.g., desirable based on the conditions of the soil and/or vegetation prior to applying the one or more additives). In several embodiments, water makes the soil additives soluble and brings the soil additives, including immobilized soil additives (e.g., immobilized nutrients), within the deep root ecosystem 360. In several embodiments, the plant roots 352 thrive within the deep root ecosystem 360, encouraging the roots 352 to grow longer (e.g., the root cells to elongate). In the depicted example, water depletion occurs above the water depletion line 356, while root growth occurs below the water depletion line 356.

Providing Timely Consumable Delivery Based on Consumable Demand Predictions

Figure 9:
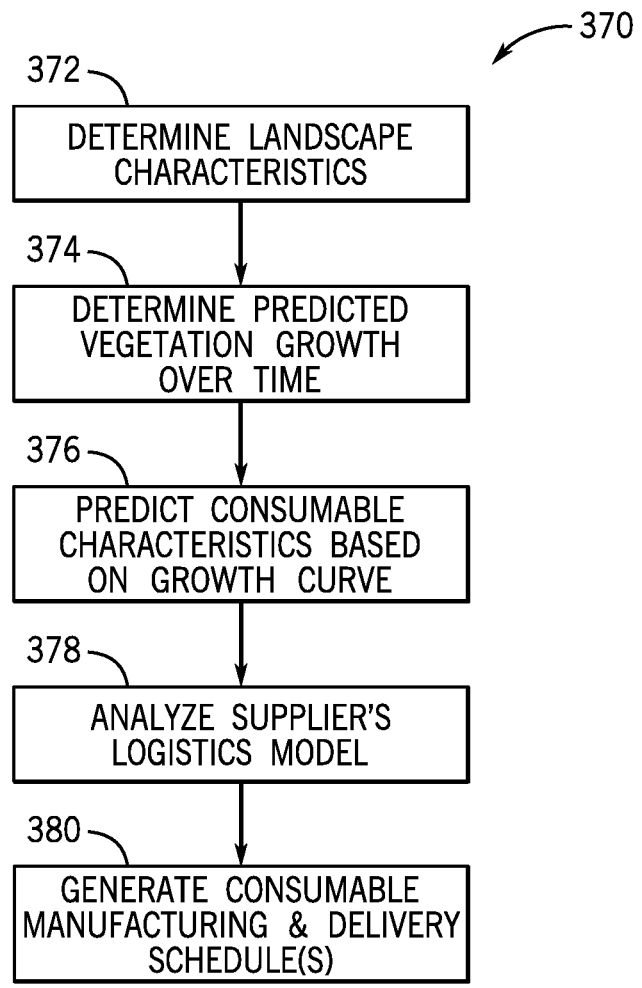
FIG. 9 is a flow chart illustrating a method of generating consumable manufacturing and delivery schedules based on predicted consumable characteristics over time.

In several embodiments, consumable demand may be forecasted and the forecasted demand may be tied to one or more logistics models for one or more third party suppliers to provide timely delivery of the consumables. For example, FIG. 9 is a flow chart illustrating a method of generating consumable manufacturing and delivery schedules based on predicted consumable characteristics over time. The method 370 begins with operation 372 and landscape characteristics are determined. Landscape characteristics may include vegetation characteristics (e.g., type/species, height, root depth, etc.), soil conditions, watering schedules, location, weather, land use, land age, temperature, light exposure, and the like. In several embodiments, the landscape characteristics may be historical data over time (e.g., historical vegetation characteristics, soil conditions, watering schedules, weather, land use, temperature, light exposure, etc.), and the like. Landscape characteristics may be input by a user or by one or more sensors, and/or retrieved from a database.

After operation 372, the method 370 proceeds to operation 374 and predicted vegetation growth over time is determined. In some embodiments, the predicted growth over time is determined based on the one or more landscape characteristics. For example, based on historical data over time, vegetation growth over one or more seasons can be predicted. In some embodiments, the predicted growth over time may be dynamic and may be updated as actual (as opposed to historical) landscape characteristic data is collected and input into the system. As one example, actual temperature data may be input into the system. The system may compare the actual temperature data to the historical temperature data to determine whether the time period (e.g., the month of July) is hotter or cooler than usual. The growth curve may be adjusted accordingly during that time period (e.g., the month of July) based on the actual recorded data. In some embodiments, a standard yield/growth curve may be retrieved from a database based on one or more landscape characteristics (e.g., based on location, species, temperature, and the like).

After operation 374, the method 370 proceeds to operation 376 and consumable characteristics are predicted based on the growth curve. Consumable characteristics may include consumable type and amount, application timing, frequency and duration. Based on the point in the vegetation growth cycle, different consumables may be needed. For example, if certain undesirable vegetation (e.g., weeds) is expected to have increased growth at a particular time period in the growth season, a weed killer may be needed to eliminate such vegetation during that time. As another example, if growth of the desired vegetation is expected to decline, for example, due to predicted high temperatures and dry soil conditions, then a soil conditioner may be needed to improve vegetation growth.

After operation 376, the method 370 proceeds to operation 378 and a supplier logistics model is analyzed to determine supply and timing from acquisition and/or generation to delivery. A supplier logistics model may include a supplier's manufacturing capacity (e.g., how many consumable units the supplier can produce at a given time), timing (e.g., for stocking inventory, manufacturing, packaging, delivery, etc.), supply, and the like.

After operation 378, the method 370 proceeds to operation 380 and a manufacturing and delivery schedule is generated based on the predicted consumable characteristics and the supplier logistics model. Based on the consumable characteristics and the supplier's logistics model, a time to begin the process of acquiring and/or generating the needed consumables can be determined. As one example, based on the growth curve, the system predicted that 12 gallons of consumable A are needed by July 15 and 12 gallons of consumable B are needed by July 29. Based on the analysis of the supplier logistics model, the system determined that a supplier can only generate 6 gallons of consumable A at a time, and that it takes a supplier 1 week to acquire enough raw materials to produce 6 gallons of consumable A, 1 week to generate 6 gallons of consumable A, 1 week to ferment 6 gallons of consumable A, and 1 week to deliver consumable A. In this example, for consumable B, the system determined that the supplier can only generate 12 gallons of consumable B at a time, and that it takes the supplier 2 weeks to acquire the raw materials to produce 12 gallons of consumable B, 2 weeks to generate 12 gallons of consumable B, and 2 weeks to deliver consumable B.

The system may have also determined that the supplier has no raw materials in stock to produce consumable A and enough raw materials in stock to produce 12 gallons of consumable B. Based on the logistics model, to provide 12 gallons of consumable A by July 15, the supplier needs to allow 1 week to deliver consumable A, 2 weeks to ferment 12 gallons of consumable A, 2 weeks to generate 12 gallons of consumable A, and 2 weeks to acquire the raw materials for the 12 gallons of consumable A. In other words, the supplier needs 7 weeks from acquisition to delivery of consumable A. Thus, to deliver by July 15, the supplier needs to begin the acquisition process 7 weeks prior (e.g., around June 27). To provide 12 gallons of consumable B by July 29, the supplier needs to allow 2 weeks to deliver consumable B and 2 weeks to generate 12 gallons of consumable B. In this example, the supplier does not need to allow for acquisition time since the supplier already has enough raw materials in stock to produce the 12 gallons of consumable B. In this example, the supplier needs 4 weeks from generation to delivery of consumable B. Thus, to deliver by July 29, the supplier needs to begin generating consumable B 4 weeks prior (e.g., around July 1).

In this manner, a supplier can prepare expected consumable orders in advance to ensure consumable delivery at an optimal time for consumable application, improving the efficiency of consumable delivery.

Machine Learning-Based Schedule and/or Kit Adjustments

In several embodiments, the watering schedule and/or the soil enhancement kit may be established, adjusted, and/or implemented by machine learning (ML). The amount of water applied, frequency of watering events, duration of watering, and the like, may depend on several factors (e.g., dynamic and/or static variables). For example, the watering schedule may depend on root depth, vegetation species, crop coefficient ($K_c$), weather, available soil water capacity, maximum allowed water depletion, historical data, and the like. As one or more of the variables changes over time, the watering schedule is adjusted to optimize the vegetation health. To determine how to adjust the watering schedule as the input variables change, the input variables may be fed into a machine learning algorithm or model. In some examples, estimated input variables (e.g., historical, expected, common, or arbitrary values) are input into the model to determine an impact on the watering schedule. In this example, several simulations with varying input variables may be run through the model so that the system can learn and improve. In some examples, the input variables may be actual data collected from users. For example, a user or the system (e.g., via a sensor) may collect data on vegetation characteristics, soil condition, and the like, which is input into a machine learning algorithm to determine a watering schedule.

As another example, the type, amount, time and duration of application, and the like, of the components/consumables in the soil enhancement kit may vary depending on numerous variables, such as those discussed above with respect to the soil enhancement kit (e.g., vegetation data, soil data, zone data, etc.). As these variables change, the kit recipe (e.g., the type and amount of consumables) and the kit application instructions (e.g., how and when to apply the consumables) may be adjusted to optimize the vegetation health. To determine how to adjust the kit recipe and kit application instructions as the input variables change, the input variables may be fed into a machine learning algorithm. In some examples, estimated input variables are input into the algorithm to determine the impact on the kit. In some examples, actual data collected (e.g., by a user or the system) may be input into the algorithm.

Figure 10:
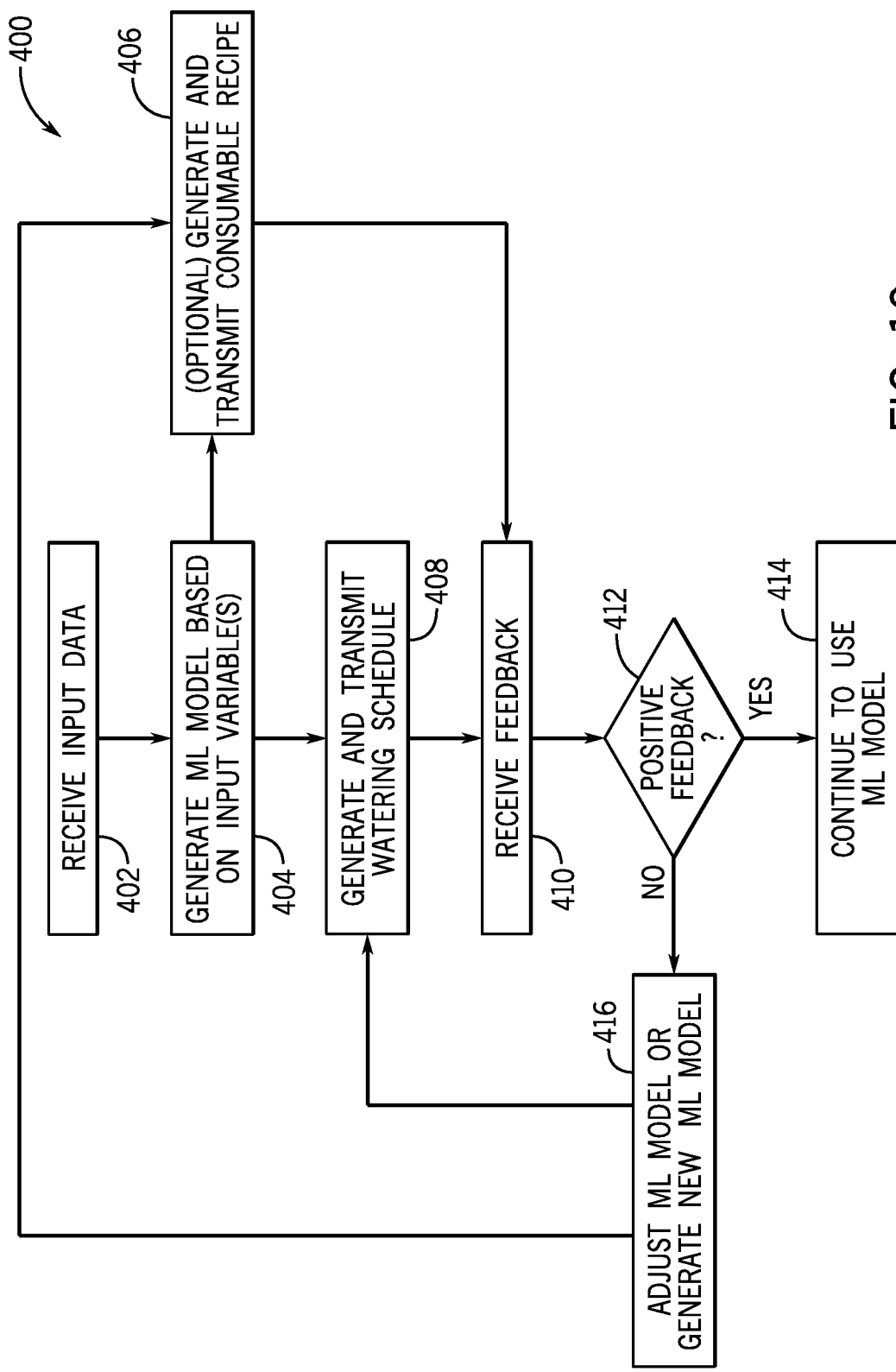
FIG. 10 is a flow chart illustrating a method for generating a watering schedule or consumable recipe with reinforcement machine learning.

In some embodiments, the system learns how to improve vegetation health through reinforcement learning. As one example, FIG. 10 is a flow chart illustrating a method for generating a watering schedule or consumable recipe (i.e., a soil enhancement kit) with reinforcement learning. The method 400 begins with operation 402 and input data is received by a server. The input data may be one or more of the input variables discussed previously, such as, for example, root depth, historical watering schedules, vegetation characteristics, soil conditions, zone data, weather data, and environmental data. As one example, the input data may include root depth, crop coefficient ($K_c$), weather data, soil water capacity, maximum allowed water depletion, and the like. Some of the input variables may be dynamic (e.g., root depth), while others may be static (e.g., vegetation type). The input data may be generated (e.g., by various simulation runs testing different permutations and combinations of data), estimated (e.g., arbitrary values, expected values, historical values, etc.), or actual data collected.

After operation 402, the method 400 proceeds to operation 404 and a machine learning (ML) model is generated based on the one or more input variables. For example, one or more input variables may be fed into a machine learning algorithm, such as, for example a neural network, decision tree, support vector machine, and the like. As one example, the system may use statistical probability (e.g., sorting, weighting, and organizing the inputs in varying permutations and combinations) to determine a ML model. The inputs are sorted, weighted, and organized according to the ML model to assess watering and/or consumable needs, amounts, frequency, duration, and the like.

After operation 404, the method 400 optionally proceeds to operation 406 and a consumable recipe may be generated based on the ML model. The ML model may sort, weight, and organize the input data to assess consumable needs (e.g., type, amounts, timing, frequency and/or duration of application, and the like). For example, the ML model may use vegetation, soil, and zone data generated, estimated, or collected, to predict a consumable recipe and application instructions. The consumable recipe may be transmitted to the server and/or to one or more third party suppliers to obtain the needed consumables (e.g., type and amount) in an appropriate time frame according to the application instructions (e.g., time and duration of application).

In addition to operation 406 or as an alternative to operation 406, the method 400 proceeds from operation 404 to operation 408 and a watering schedule is generated based on the ML model. In this step, the ML model may sort, weight, and organize the input data to assess watering needs (e.g., watering volume, duration, frequency, etc.). For example, the ML model may use root depth, vegetation species, crop coefficient ($K_c$), weather, available soil water capacity, and maximum allowed water depletion to predict a watering schedule. The watering schedule may be transmitted to one or more controllers to open one or more sprinkler valves based on the watering schedule.

After operation 408, and optionally after operation 406, the method 400 proceeds to operation 410 and feedback is received. Feedback may be received from a user or from the system (e.g., from one or more sensors). For example, a user may input feedback through an application on a user device that is connected to the server over the network. As one example, a user may select a button (e.g., YES or NO), icon (e.g., a thumbs up or thumbs down), or the like, on an application interface on the user device. As another example, a user may key in feedback (e.g., key in "approve" or "disapprove") on the user device. The user may provide qualitative feedback (e.g., positive or negative, like or dislike, yes or no, thumbs up or down, or the like), quantitative feedback (e.g., a number in a range or scale of numbers indicating a level of like/approval or dislike/disapproval—e.g., between 1 and 10, 1 being strong dislike/disapproval and 10 being strong like/approval), or the like. In some cases, the feedback may be dynamic, such that the user may input varying feedback over time.

User feedback may be personalized or aggregated feedback from multiple users. For example, a user may input personalized feedback related to the user's satisfaction with the state of the vegetation. For example, an eco-friendly user may prefer a less lush/green lawn and may provide approval/ satisfaction feedback with a lawn that is less lush/green, while a user preferring a lusher/greener lawn may provide disapproval/dissatisfaction feedback with the less lush/green lawn. In this example, the input is individualized based on the user. As another example, user feedback may be collected from a plurality of users and input into the system as global user feedback. In some examples, the plurality of users have one or more shared landscape or user characteristics. For example, the landscapes may be in the same or similar geographical location, may have the same or similar vegetation type, may have similar characteristics (e.g., soil type, sun exposure, slope, etc.), may have the same watering restrictions (e.g., issued by a municipality), and the like. As another example, the users may have similar behaviors or preferences for their lawns. For example, users may use a portion of the lawn more heavily than other areas (e.g., backyard used more than front yard), may have similar cost concerns (e.g., desire to spend less on a water bill), may have similar lawn appearance preferences (e.g., eco-friendly vs. lush), may have similar travel schedules (e.g., weekend travelers), and the like. In this example, trends in the feedback data may be analyzed and an overall (e.g., typical or average) user feedback may be determined. For example, if ten users in the same geographical area provide positive feedback, while only one user provides negative feedback, the system may determine the overall user feedback is positive.

As another example, feedback may be received by one or more sensors. As one example, one or more cameras may be placed in the landscape and may capture image data. The image data may be sent to the system 100 for image processing. The system 100 may process the image to determine vegetation color, chlorophyll content, height, root depth, soil density/porosity, and the like. As another example, other sensors 106 may be used to monitor other characteristics, such as soil moisture levels, nutrient levels, microbial activity, and the like. The system 100 may use the collected data to determine overall landscape health. For example, greener and higher vegetation with greater chlorophyll content and a longer root depth may indicate overall healthy landscape, while browner, shorter vegetation with less chlorophyll content and shorter root depth may indicate overall unhealthy landscape.

After operation 410, the method 400 proceeds to operation 412 and the server determines whether the feedback is positive. For example, positive feedback encourages a reinforcement ML model to continue the same or similar path (e.g., reinforces the behavior of the model). In such a model, negative feedback causes the model to change course and alter its behavior to receive positive feedback (e.g., the model changes until the model learns it is on the right track). For example, positive feedback from a user may include agreement (e.g., YES), approval, liking, a numerical value or range representing approval (e.g., 10 out of 10, a number between 6-10 out of 10), an icon representing approval (e.g., a thumbs up, a smiley face, clapping, etc.), or the like. As another example, positive feedback from the system (e.g., from a sensor) may include indications of a healthy landscape (e.g., greener and higher vegetation, greater chlorophyll content, longer root depth, etc.).

If the feedback is positive, the method 400 proceeds to operation 414 and the server continues to use the ML model for future watering schedules and/or consumable recipes. In other words, the positive feedback may reinforce the current ML model. The current ML model may be used by the same user or by other users having a similar landscape (e.g., in a same geographical location, with the same vegetation type, etc.). As one example, the ML model may be applied to a different zone or property to determine a watering schedule and/or consumables recipe for that zone or property. In some cases, the ML model may be generated for a single zone or property having particular input variables (e.g., a particular type of vegetation, root depth, $K_c$, soil conditions, etc.). The zone or property may be representative of other zones or properties (e.g., those having similar characteristics), such that the ML model generated for the zone or property may be used as a baseline ML model for the other zones or properties. Based on a comparison of the other zones or properties to the representative zone or property, differences in zone or property characteristics may be determined. The differences may be used to adjust the baseline ML model to create zone-specific or property-specific ML models.

If the feedback is negative, the method 400 proceeds to operation 416 and the ML model is adjusted or a new ML model is generated. For example, if the ML model is adjusted, the manner in which the inputs are sorted, weighted, and/or organized may be tweaked to generate a watering schedule that is different than the prior watering schedule generated and transmitted at operation 408. Based on the negative feedback provided, the ML model is accordingly adjusted to improve the results (e.g., the vegetation health). In some examples, a new ML model is generated and a new manner of sorting, weighting, and/or organizing the inputs is applied to the new ML model. After operation 416, the method 400 optionally proceeds to operation 406 and a new consumable recipe may be generated based on the adjusted or new ML model. In addition to operation 406 or as an alternative to operation 406, the method 400 proceeds to operation 408 and a new watering schedule is generated based on the adjusted or new ML model. The method 400 continues to proceed through the operations, as discussed above, until positive feedback reinforces the generated ML model.

Figure 11:
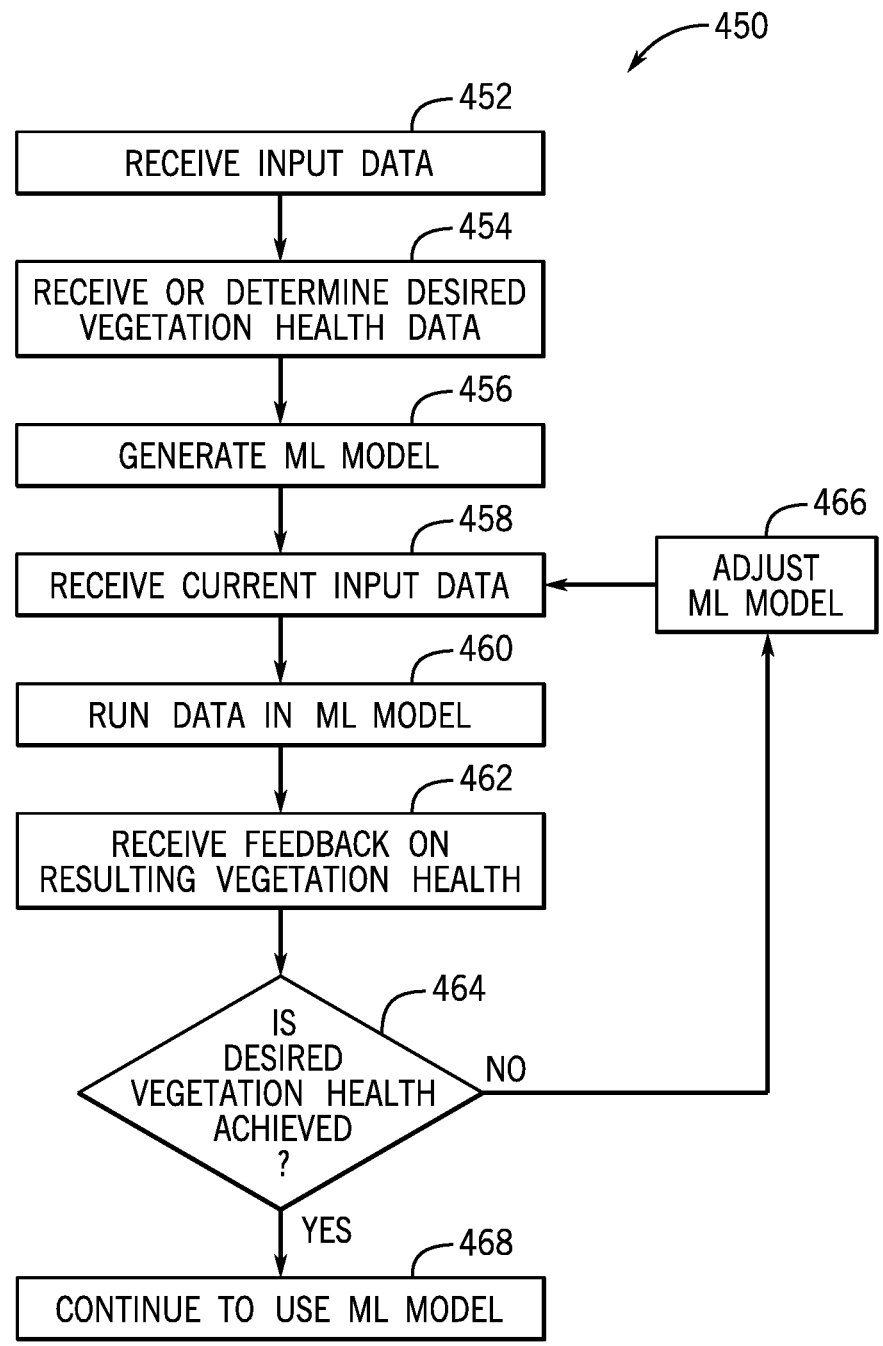
FIG. 11 is a flow chart illustrating a method for generating a watering schedule or consumable recipe with supervised machine learning.

In some embodiments, the system learns how to improve vegetation health through supervised learning. As one example, FIG. 11 is a flow chart illustrating a method for generating a watering schedule or consumable recipe (i.e., a soil enhancement kit) with supervised learning. The method 450 begins with operation 452 and input data is received. The input data may be the same as the input data discussed above with respect to method 400 and operation 402.

After operation 452, the method 450 proceeds to operation 454 and desired vegetation health data is received. For example, a user may input a desired vegetation coloration, chlorophyll content, or other measurable vegetation characteristic indicative of vegetation health. In some examples, the desired vegetation health data is personalized data, specific to the user, or may be global data associated with multiple users. For example, a plurality of users may input desirable conditions for vegetation health. In some examples, the plurality of users have one or more shared landscape or user characteristics. For example, the landscapes may be in the same or similar geographical location, may have the same or similar vegetation type, may have similar characteristics (e.g., soil type, sun exposure, slope, etc.), may have the same watering restrictions (e.g., issued by a municipality), and the like. As another example, the users may have similar behaviors or preferences for their lawns. For example, users may use a portion of the lawn more heavily than other areas (e.g., backyard used more than front yard), may have similar cost concerns (e.g., desire to spend less on a water bill), may have similar lawn appearance preferences (e.g., eco-friendly vs. lush), may have similar travel schedules (e.g., weekend travelers), and the like. In this example, trends in the desirable vegetation health data may be analyzed and an overall (e.g., typical or average) desired vegetation health may be determined.

After operation 454, the method 450 proceeds to operation 456 and a ML model is generated based on the input data received at operation 452 and the desired vegetation health data received or determined at operation 454. For example, in supervised learning, the input variable(s) and output variable(s) are known and fed into a machine learning algorithm to learn the mapping function from the input to the output. In this example, the input data from operation 452 and vegetation health data from operation 454 are fed into a machine learning algorithm to generate the ML model.

After operation 456, the method 450 proceeds to operation 458 and current input data is received. For example, current input data may be input by a user or by the system (e.g., by one or more sensors). The current input data may be current measurements of one or more of the input variables discussed previously, such as, for example, root depth, vegetation characteristics, soil conditions, zone data, weather data, and environmental data.

After operation 458, the method 450 proceeds to operation 460 and the current input variables are run through the ML model. For example, the input variables may be sorted, weighted, mapped, and/or organized according to the ML model to produce the desired vegetation health data received or determined at operation 454 (i.e., the desired output).

After operation 460, the method 450 proceeds to operation 462 and feedback on the actual resulting vegetation health is received. For example, a user or the system (e.g., one or more sensors) may provide feedback on vegetation health. For example, the feedback may be one or more of the types of feedback discussed for operation 410 of method 400.

After operation 462, the method 450 proceeds to operation 464 and the system determines whether the desired vegetation health is achieved. For example, the server may compare the resulting vegetation health determined at operation 462 to the desired vegetation health data received or determined at operation 454 to determine whether the desired vegetation health is achieved. If the desired vegetation health is achieved (e.g., the resulting vegetation health is the same as the desired vegetation health), then the method 450 proceeds to operation 468 and the system continues to use the ML model generated at operation 456. If the desired vegetation health is not achieved (e.g., the resulting vegetation health differs from the desired vegetation health), then the method 450 proceeds to operation 466 and the ML model generated at operation 456 is adjusted. For example, the sorting, weighting, mapping, and/or organization of the input variables may be tweaked to alter the ML model. After the ML model is adjusted at operation 466, current input data is received at operation 458 and run through the adjusted ML model at operation 460. The method 450 continues to proceed through the operations, as discussed above, until the desired vegetation health is achieved.

Additional System Components

Figure 12:
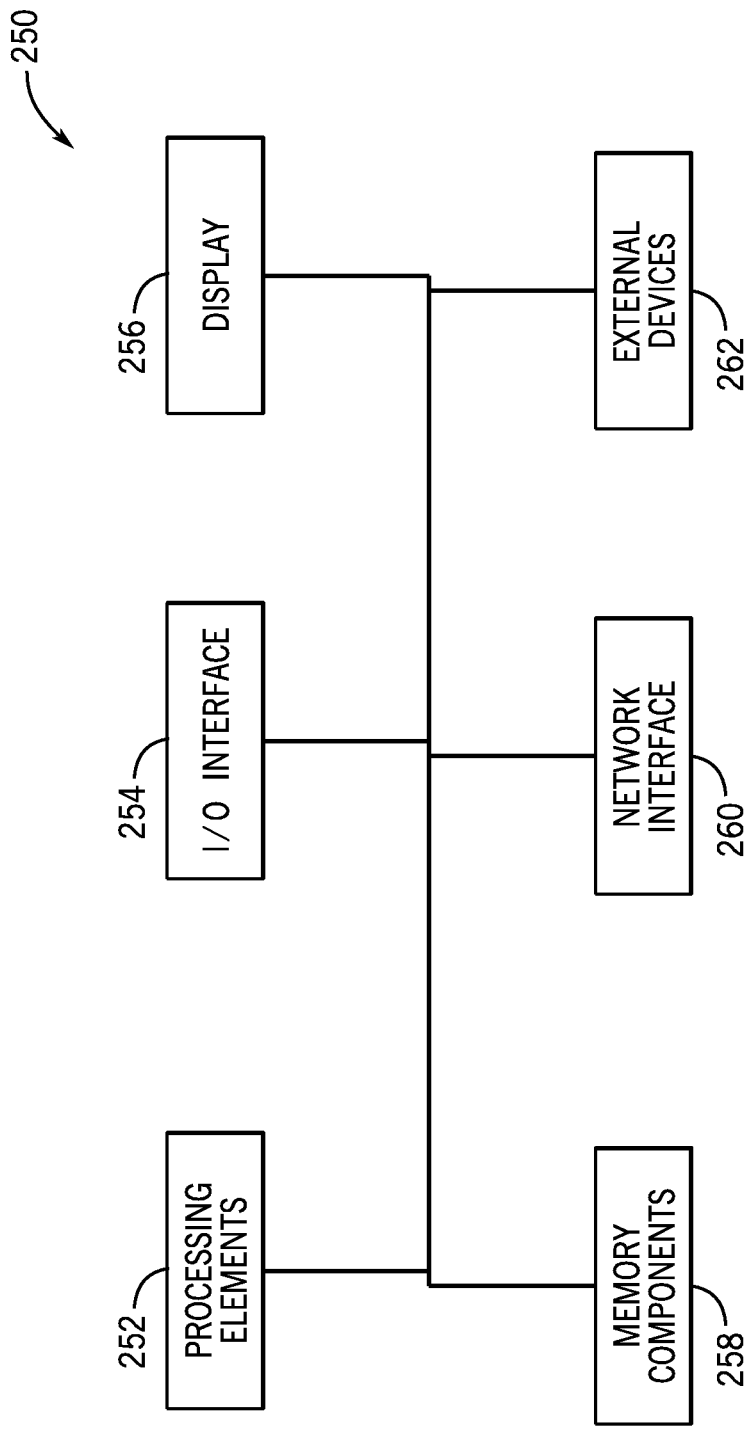
FIG. 12 is a simplified block diagram of a computing device that can be used by one or more components of the system of FIG. 1.

FIG. 12 is a simplified block diagram of a computing device 250 that can be used by one or more components of the system 100. For example, the central controller 104, user devices 108a-108n, and/or controllers 102, 112 may include one or more of the components shown in FIG. 12 and be used to execute one or more of the operations disclosed in methods 150, 200, and 220. With reference to FIG. 12, the computing device 250 may include one or more processing elements 252, an input/output (I/O) interface 254, a display 256, one or more memory components 258, a network interface 260, and one or more external devices 262. Each of the various components may be in communication with one another through one or more busses, wireless means, or the like.

The processing element 252 is any type of electronic device capable of processing, receiving, and/or transmitting instructions. For example, the processing element 252 may be a central processing unit, microprocessor, processor, or microcontroller. Additionally, it should be noted that select components of the computer 250 may be controlled by a first processor and other components may be controlled by a second processor, where the first and second processors may or may not be in communication with each other.

The memory components 258 are used by the computer 250 to store instructions for the processing element 252, as well as store data, such as the historical data, the vegetation and soil specifications, and the like. The memory components 258 may be, for example, magneto-optical storage, read-only memory, random access memory, erasable programmable memory, flash memory, or a combination of one or more types of memory components.

The display 256 provides visual feedback to a user and, optionally, can act as an input element to enable a user to control, manipulate, and calibrate various components of the computing device 250. The display 256 may be a liquid crystal display, plasma display, organic light-emitting diode display, and/or cathode ray tube display. In embodiments where the display 256 is used as an input, the display may include one or more touch or input sensors, such as capacitive touch sensors, resistive grid, or the like.

The I/O interface 254 allows a user to enter data into the computer 250, as well as provides an input/output for the computer 250 to communicate with other devices (e.g., central controller 104, controllers 102, 112, other computers, speakers, etc.). The I/O interface 254 can include one or more input buttons, touch pads, and so on.

The network interface 260 provides communication to and from the computer 250 to other devices. For example, the network interface 260 allows the server 104 to communicate with the controllers 102, 112 through the network 114. The network interface 260 includes one or more communication protocols, such as, but not limited to, WiFi, Ethernet, Bluetooth, and so on. The network interface 260 may also include one or more hardwired components, such as a Universal Serial Bus (USB) cable, or the like. The configuration of the network interface 260 depends on the types of communication desired and may be modified to communicate via WiFi, Bluetooth, and so on.

The external devices 262 are one or more devices that can be used to provide various inputs to the computing device 250, e.g., mouse, microphone, keyboard, trackpad, or the like. The external devices 262 may be local or remote and may vary as desired.

The above specification, examples and data provide a complete description of the system and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims. Further, it should be understood that logical operations may be performed in any order, unless explicitly claimed otherwise or a specific order is inherently necessitated by the claim language.

What is claimed is:

1. A method for generating a dynamic watering plan that reduces water consumption requirements for vegetation comprising:
   estimating, by a processing element, root depth of vegetation watered by a watering system;
   determining, by the processing element, an allowed water depletion threshold of the vegetation based on the root depth;
   determining, by the processing element, a training watering plan that is based on the root depth and the allowed water depletion threshold wherein the training watering plan comprises:
      a plurality of watering events, each watering event including a watering duration and a water volume, wherein the watering duration and the water volume are determined based on a root depth value, the root depth value estimated based on at least one of the weather variable, the soil condition, the watering history, or the vegetation specification; and
      a plurality of training periods, wherein each training period is implemented between adjacent watering events of the plurality of watering events and each training period is determined based on a water depletion threshold and a water depletion rate, and wherein the water depletion threshold is based on the root depth value and the water depletion rate based on at least one of the weather variable, the soil condition, the watering history, or the vegetation specification; and
   transmitting the training watering plan to a flow controller for execution by the watering system.

2. The method of claim 1, wherein the training watering plan adjusts watering volume per watering event based on changes in root depth over time.

3. The method of claim 1, wherein the training watering plan increases time periods between watering events as the allowed water depletion threshold increases based on increasing root depth.

4. The method of claim 2, wherein the watering volume for a given watering event is sufficient to engulf at least a lower portion of the roots.

5. The method of claim 1, wherein determining the training watering plan further comprises utilizing, by the processing element, at least one of crop coefficient and yield curve of the vegetation to determine the training watering plan.

6. The method of claim 1, wherein determining the training watering plan further comprises utilizing, by the processing element, soil characteristics to determine the training watering plan, the soil characteristic comprising at least one of water content, water capacity, water depletion rate, and temperature.

7. The method of claim 1, wherein the training watering plan decreases watering frequency over time until a desired root depth is achieved.

8. The method of claim 7, wherein the desired root depth is determined based on user feedback corresponding to vegetative characteristics.

9. The method of claim 1, further comprising varying variables for at least one of the root depth and the allowed water depletion threshold based on application of a soil additive.

10. A watering system for vegetation comprising:
   a server configured to receive, process, and transmit information;
   a sensor for detecting at least one of weather variables, soil moisture levels, or vegetation characteristics;
   one or more databases containing information on at least one of watering history and vegetation specifications and communicatively coupled to the server; and
   one or more controllers in communication with the server and connected to at least one water outlet of a plurality of water outlets, the server including a non-transitory computer readable media and configured to execute instructions stored on the non-transitory computer readable media, the instructions comprising:
      estimating a root depth value based on at least one of the weather variables, soil moisture levels, vegetation characteristics, watering history, and vegetation specifications;
      determining a water depletion threshold based on the root depth value;
      estimating a water depletion rate based on at least one of the weather variables, soil moisture levels, vegetation characteristics, watering history, and vegetation specifications; and
      determining a watering plan that is based at least on the root depth value, the water depletion threshold, and the water depletion rate, wherein the watering plan comprises:
         a plurality of watering events, wherein each watering event comprises a watering duration and a water volume, wherein the watering duration and the water volume are determined based on the root depth value; and
         a plurality of training periods, wherein each training period is implemented between watering events and each training period is determined based on the water depletion threshold and the water depletion rate.

11. The watering system of claim 10, wherein the plurality of training periods increase in length as the watering plan continues to execute.

12. The watering system of claim 10, further comprising varying variables for at least one of the root depth, the water depletion threshold, and the water depletion rate based on application of a soil additive.

13. The watering system of claim 10, wherein the instructions further comprise adjusting the watering plan based on user feedback.

14. The watering system of claim 10, wherein determining the watering plan comprises feeding at least the root depth value, the water depletion threshold, and the water depletion rate into a machine learning model.

15. The watering system of claim 14, wherein the machine learning model is a reinforcement model, wherein positive feedback reinforces the machine learning model.

16. The watering system of claim 10, wherein the sensor is a camera, and the server is further configured to process images received from the camera to determine at least one of soil moisture levels and vegetation characteristics.

17. The watering system of claim 10, wherein an output signal is sent to the server when the sensor is activated.

18. A system for generating a watering schedule for vegetation comprising:

a server including a memory component;

a sensor, in communication with the server, configured to detect first information related to one or more of a weather variable, a soil condition, or a vegetation specification;

a database containing second information related to one or more watering factors, the watering factors including one or more of a watering history, the vegetation specification, the soil condition, weather, or a user preference, the database in communication with the server, wherein the server is configured to perform steps including:

receiving one or more of the first information and the second information, and generating watering schedule data from the first information and the second information; and a controller in communication with the server, the controller configured to receive the watering schedule data from the server and open one or more flow control valves to implement the watering schedule, wherein the watering schedule comprises:

a plurality of watering events, each watering event including a watering duration and a water volume, wherein the watering duration and the water volume are determined based on a root depth value, the root depth value estimated based on at least one of the weather variable, the soil condition, the watering history, or the vegetation specification; and a plurality of training periods, wherein each training period is implemented between adjacent watering events of the plurality of watering events and each training period is determined based on a water depletion threshold and a water depletion rate, and wherein the water depletion threshold is based on the root depth value and the water depletion rate based on at least one of the weather variable, the soil condition, the watering history, or the vegetation specification.

19. The watering system of claim 10, wherein the watering plan comprises a plurality of watering events, wherein each watering event comprises a watering duration and a water volume, wherein the watering duration and the water volume are determined based on the root depth value.

* * * * *